(12) United States Patent
Kikuchi et al.

(10) Patent No.: US 9,079,579 B2
(45) Date of Patent: Jul. 14, 2015

(54) CONTROL APPARATUS FOR VEHICLE AND CONTROL METHOD FOR VEHICLE

(71) Applicant: NISSAN MOTOR CO., LTD., Yokohama-shi, Kanagawa-ken (JP)

(72) Inventors: Hironobu Kikuchi, Isehara (JP); Katsuhiko Hirayama, Isehara (JP)

(73) Assignee: NISSAN MOTOR CO., LTD., Yokohama-Shi (JP)

(*) Notice: Subject to any disclaimer, the term of this patent is extended or adjusted under 35 U.S.C. 154(b) by 0 days.

(21) Appl. No.: 13/829,699

(22) Filed: Mar. 14, 2013

(65) Prior Publication Data
US 2013/0253764 A1 Sep. 26, 2013

(30) Foreign Application Priority Data
Mar. 23, 2012 (JP) ................. 2012-066458

(51) Int. Cl.
B60W 10/22 (2006.01)
B60G 17/016 (2006.01)
B60G 17/0195 (2006.01)
B60G 17/06 (2006.01)
B60T 8/1755 (2006.01)
B60W 10/06 (2006.01)
B60W 10/188 (2012.01)
B60W 30/18 (2012.01)

(52) U.S. Cl.
CPC ............. B60W 10/22 (2013.01); B60G 17/016 (2013.01); B60G 17/0195 (2013.01); B60G 17/06 (2013.01); B60T 8/17555 (2013.01); B60W 10/06 (2013.01); B60W 10/188 (2013.01); B60W 30/18 (2013.01); B60G 2400/102 (2013.01); B60G 2500/10 (2013.01); B60T 2260/06 (2013.01); B60W 2510/18 (2013.01); B60W 2720/00 (2013.01)

(58) Field of Classification Search
None
See application file for complete search history.

(56) References Cited

U.S. PATENT DOCUMENTS

| 6,909,959 | B2* | 6/2005 | Hallowell | 701/88 |
|---|---|---|---|---|
| 7,788,011 | B2* | 8/2010 | Sugiyama | 701/69 |
| 8,880,292 | B2* | 11/2014 | Shiozawa et al. | 701/37 |
| 2005/0049761 | A1* | 3/2005 | Kataoka et al. | 701/1 |
| 2005/0143896 | A1* | 6/2005 | Sawada et al. | 701/96 |
| 2008/0009992 | A1* | 1/2008 | Izawa et al. | 701/37 |
| 2008/0119984 | A1* | 5/2008 | Hrovat et al. | 701/38 |
| 2008/0249690 | A1* | 10/2008 | Matsumoto et al. | 701/36 |
| 2011/0202235 | A1* | 8/2011 | Oikawa | 701/36 |
| 2011/0266760 | A1* | 11/2011 | Itabashi | 280/5.507 |
| 2012/0059544 | A1* | 3/2012 | Kinoshita et al. | 701/22 |
| 2012/0185136 | A1* | 7/2012 | Ohnuma et al. | 701/48 |
| 2012/0265400 | A1* | 10/2012 | Oikawa | 701/37 |
| 2013/0197754 | A1* | 8/2013 | Lee et al. | 701/37 |
| 2013/0218388 | A1* | 8/2013 | Katsuyama | 701/22 |
| 2014/0088792 | A1* | 3/2014 | Saito | 701/1 |

FOREIGN PATENT DOCUMENTS

| JP | 2008105471 A | * | 5/2008 |
|---|---|---|---|
| JP | 2011-223691 A | | 11/2011 |

* cited by examiner

Primary Examiner — John R Olszewski
Assistant Examiner — David Merlino
(74) Attorney, Agent, or Firm — Foley & Lardner LLP

(57) ABSTRACT

A control apparatus for a vehicle is provided with a plurality of actuators which perform sprung vibration suppression control, a vertical acceleration sensor configured to detect sprung vertical acceleration, and a plurality of actuator attitude control units which control the respective actuators such that the vertical acceleration detected by the vertical acceleration sensor becomes vertical acceleration corresponding to a target sprung state.

7 Claims, 13 Drawing Sheets

CONTROL APPARATUS FOR VEHICLE AND CONTROL METHOD FOR VEHICLE

BACKGROUND

1. Technical Field

The present invention relates to a control apparatus configured to control a state of a vehicle.

2. Related Art

As a technique related to a control apparatus for a vehicle, Japanese Patent Application Publication No. 2011-223691 discloses a technique of controlling a vibration state of a vehicle body using a driving force.

SUMMARY

However, vibration suppression control using merely a driving force has difficulty in sufficiently suppressing the vibration.

The present invention is made in view of the abovementioned problem, and aims to provide a control apparatus for a vehicle capable of suppressing vibration of the vehicle.

One aspect of the present invention is a control apparatus for a vehicle. This control apparatus for a vehicle is provided with a plurality of actuators configured to perform sprung vibration suppression control, a vertical acceleration sensor configured to detect a sprung vertical acceleration, and a plurality of actuator attitude control units configured to control the respective actuators such that the vertical acceleration detected by the vertical acceleration sensor becomes a vertical acceleration corresponding to a target sprung state. The plurality of actuators are a driving power source, a friction brake, and a damping force variable shock absorber of a vehicle, and the plurality of actuator attitude control units are a driving power source attitude control unit, a friction brake attitude control unit, and a damping force control unit, and the driving power source attitude control unit suppresses a bounce movement and a pitch movement of a vehicle body.

Another aspect of the present invention is a control apparatus for a vehicle which is provided with a sensor configured to detect a sprung vertical acceleration, and a controller configured to control a plurality of actuators configured to perform sprung vibration suppression control such that the vertical acceleration detected by the sensor becomes a vertical acceleration corresponding to a target sprung state. The controller is configured to control the plurality of actuators configured to suppress a bounce movement and a pitch movement of a vehicle body.

Still another aspect of the present invention is a control method for a vehicle. This control method for a vehicle includes a sensor configured to detect a sprung vertical acceleration, and includes a step of controlling, by a controller, a plurality of actuators configured to perform sprung vibration suppression control such that vertical acceleration detected by the sensor becomes a vertical acceleration corresponding to a target sprung state, and a step of controlling, by the controller, the plurality of actuators configured to suppress a bounce movement and a pitch movement of a vehicle body.

DESCRIPTION OF EMBODIMENTS

First Embodiment

Figure 1:
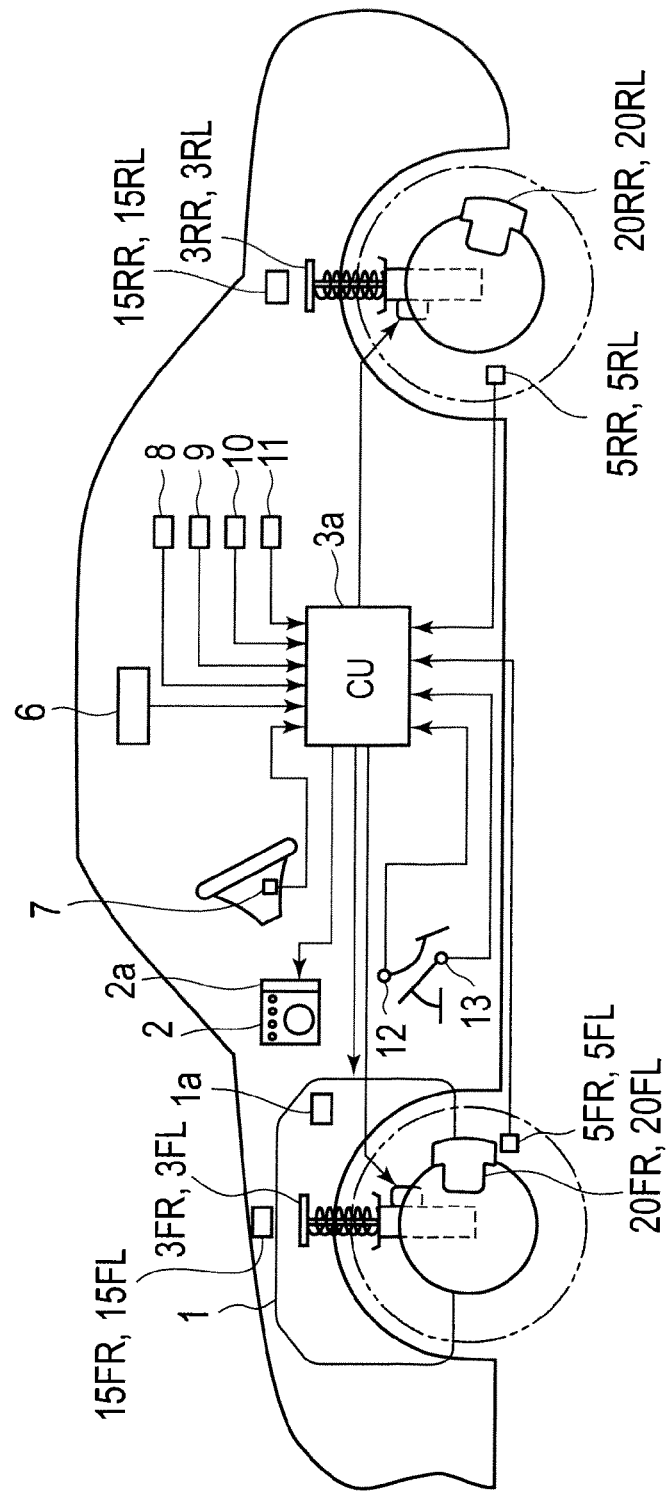
FIG. 1 is a system schematic view illustrating a control apparatus for a vehicle according to a first embodiment.

FIG. 1 is a system schematic view illustrating a control apparatus for a vehicle according to a first embodiment. The vehicle includes an engine 1 serving as a driving power source, brakes 20 (hereinafter, when a brake corresponding to an individual wheel is displayed, described as a right front-wheel brake: 20FR, a left front-wheel brake: 20FL, a right rear-wheel brake: 20RR, and a left rear-wheel brake: 20RL) each of which generates braking torque due to a frictional force to each wheel, shock absorbers 3 each of which is provided between each wheel and a vehicle body and can control a damping force in an adjustable manner (hereinafter, described as S/A, and when an S/A corresponding to an individual wheel, the S/A is described as a right front-wheel S/A: 3FR, a left front-wheel S/A: 3FL, a right rear-wheel S/A: 3RR, and a left rear-wheel S/A: 3RL).

The engine 1 includes an engine controller (corresponding to a driving power source control unit) 1a configured to control torque outputted from the engine 1. The engine controller 1a controls the degree of opening of a throttle valve, the fuel injection quantity, ignition timing, and the like, of the engine 1, to control a desired engine operation state (the engine speed or the engine output torque). Moreover, the brake 20 generates braking torque on the basis of a hydraulic pressure supplied from a brake control unit 2 capable of controlling a brake hydraulic pressure of each wheel according to each traveling state. The brake control unit 2 includes a brake controller 2a configured to control the braking torque generated by the brake 20, and uses a master cylinder pressure generated through a brake pedal operation by a vehicle driver or a pump pressure generated by a built-in motor driving pump as a hydraulic pressure source, to generate a desired hydraulic pressure at the brake 20 of each wheel through opening and closing operations by a plurality of electromagnetic valves.

The S/A 3 is a damping force generation device which decreases an elastic motion of a coil spring provided between an unsprung portion (axles, wheels, or the like) and a sprung portion (a vehicle body or the like), of the vehicle, and is configured to vary a damping force in an adjustable manner by an operation of an actuator. The S/A 3 includes a cylinder into which a fluid is enclosed, a piston which slides up and down inside the cylinder, and an orifice which controls the fluid movement between fluid chambers formed above and below the piston. In addition, orifices having several types of orifice diameters are formed on the piston, and when the S/A actuator is being operated, an orifice in accordance with a control command is selected from the several types of orifices. This makes is possible to generate a damping force in accordance with the orifice diameter. For example, the movement of the piston is likely to be limited with the smaller orifice diameter to increase a damping force, whereas the movement of the piston is less likely to be limited with the larger orifice diameter to decrease a damping force.

Note that, in addition to the selection of the orifice, a damping force may be set, for example, such that an electromagnetic control valve is arranged on a communicating path which connects the fluid chambers formed above and below the piston, and the opening and closing amount of the electromagnetic control valve is controlled. The way to set a damping force is not especially limited. The S/A 3 includes an S/A controller 3a (corresponding to a damping force control unit) configured to control a damping force of the S/A 3, and controls the damping force to cause the S/A actuator to activate the orifice diameter.

Moreover, the vehicle includes wheel speed sensors 5 (hereinafter, when a wheel speed corresponding to an individual wheel is displayed, described as a right front-wheel speed: 5FR, a left front-wheel speed: 5FL, a right rear-wheel speed: 5RR, a left rear-wheel speed: and 5RL) each configured to detect a wheel speed of each wheel, an integrated type sensor 6 configured to detect a longitudinal acceleration acting on the gravity center of the vehicle, a yaw rate, and a lateral acceleration, a steering angle sensor 7 configured to detect an operating steering angle serving as a steering operation amount by the vehicle driver, a vehicle speed sensor 8 configured to detect a vehicle speed, an engine torque sensor 9 configured to detect engine torque, an engine speed sensor 10 configured to detect an engine speed, a master pressure sensor 11 configured to detect a master cylinder pressure, a brake switch 12 configured to output an on-state signal when a brake pedal operation is performed, an accelerator opening degree sensor 13 configured to detect an accelerator pedal opening degree, and vertical acceleration sensors 15 (hereinafter, when sprung vertical acceleration corresponding to an individual wheel is displayed, described as a right front-wheel vertical acceleration: 15FR, a left front-wheel vertical acceleration: 15FL, a right rear-wheel vertical acceleration: 15RR, and a left rear-wheel vertical acceleration: 15RL) each of which is provided near the sprung portion of the S/A 3 of each wheel and detects a vertical acceleration. The signals from these various kinds of sensors are inputted into if necessary, the engine controller la, the brake controller 2a and the S/A controller 3a. Note that, the integrated type sensor 6 may be arranged at a position of the center of gravity of the vehicle, or may be arranged at another position as long as the configuration of various kinds of values at the position of the center of gravity can be estimated. The arrangement of the integrated type sensor 6 is not especially limited. Moreover, the sensor 6 is not necessarily to an integrated type, and may be configured to detect a yaw rate, a longitudinal acceleration, and a lateral acceleration separately.

(Entire Configuration of Control Apparatus for Vehicle)

The control apparatus for a vehicle in the first embodiment uses three actuators for controlling a vibration state generated on the sprung portion. In this process, the sprung state is controlled by the respective actuators, thereby causing a problem of mutual interference. Moreover, control elements which can be controlled by the engine 1, the brake 20, and the S/A 3 are different from one another, thereby causing a problem that how to combine these control elements for performing the control.

For example, although the brake 20 can control the bounce movement and the pitch movement, the control of both the movements causes the strong sense of deceleration, thereby easily giving a discomfort feeling to a vehicle driver. Moreover, the S/A 3 can control all of the roll movement, the bounce movement, and the pitch movement. However, because performing all the control in the wide range by the S/A 3 results in increasing the manufacturing cost for the S/A 3, and a tendency of an increased damping force, high frequency vibration from the road surface side is likely to be inputted, thereby also easily giving a discomfort feeling to the vehicle driver. In other words, there is a trade-off that the control by the brake 20 does not cause the high frequency vibration to be worse but cause the sense of deceleration to be increased, whereas the control by the S/A 3 does not cause the sense of deceleration but cause the high frequency vibration to be inputted.

Therefore, as for the control apparatus for a vehicle in the first embodiment, by comprehensively judging these problems, in order that a control apparatus for a vehicle at a low cost but excellent in vibration damping ability is implemented by achieving a control configuration in which the mutual weak points are complemented to one another while the advantage points as the respective control characteristics are made to use, the overall control system thereof is constructed by considering the points listed below.

(1) The control by the engine 1 and the control by the brake 20 are performed in parallel to suppress the control amount by the S/A 3.

(2) The control object movement of the brake 20 is limited to the pitch movement to resolve the sense of deceleration due to the control by the brake 20.

(3) The control amounts by the engine 1 and the brake 20 are limited than the control amount which can be actually outputted, thereby suppressing a discomfort feeling generated with the control by the engine 1 or the brake 20 while reducing burden on the S/A 3.

(4) All the actuators perform the skyhook control. In this process, the feedback control systems are configured in all the actuators, the skyhook control is implemented by the configuration of using the sprung vertical acceleration sensor 15.

(5) When the sprung control by the S/A 3 is performed, scalar control (frequency-sensitive control) is newly introduced with respect to an input of high frequency vibration to which vector control such as skyhook control is difficult to correspond.

(6) Selecting a control state implemented by the S/A 3 as appropriate according to a traveling state provides a suitable control state in accordance with a traveling status.

The overview of the overall control system configured in the embodiment is described above. Hereinafter, specific contents which implement the control system will be successively explained.

Figure 2:
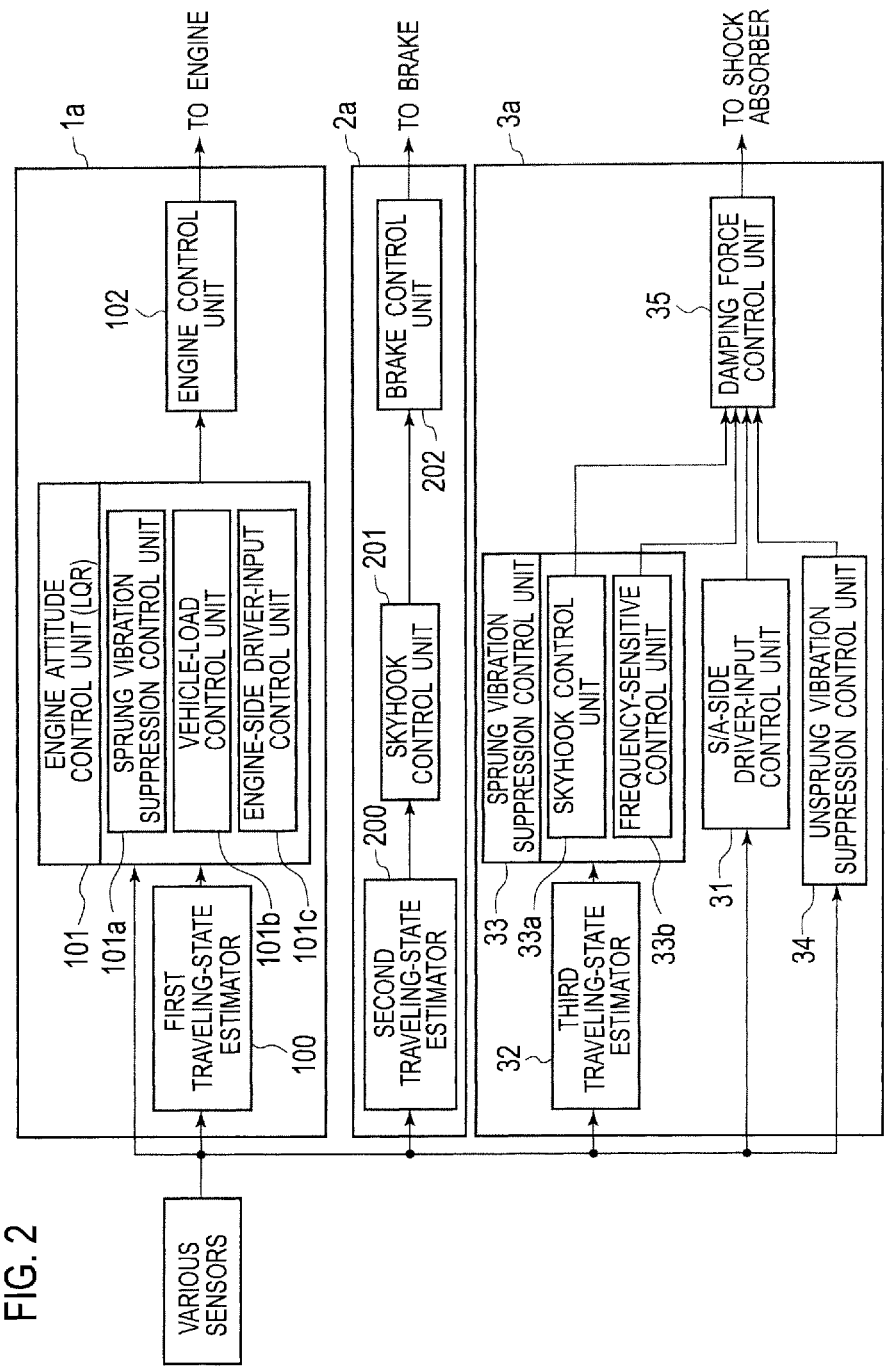
FIG. 2 is a control block diagram illustrating a control configuration of the control apparatus for a vehicle according to the first embodiment.

FIG. 2 is a control block diagram illustrating a control configuration of the control apparatus for a vehicle in the first embodiment. In the first embodiment, a controller includes three controllers of the engine controller 1a, the brake controller 2a, and the S/A controller 3a. A feedback control system based on the vertical acceleration sensor 15 is configured in the respective controllers.

Note that, although the configuration provided with three controllers as controllers is indicated in the first embodiment, all the controllers may be configured as one integral controller. The configuration is not especially limited thereto. The reason why the configuration provided with the three controllers is employed in the first embodiment is because it is assumed that the control apparatus for a vehicle in the first embodiment is implemented by using an engine controller and a brake controller in an existing vehicle without any change to be served as the engine controller 1a and the brake controller 2a, and separately mounting the S/A controller 3a.

(Configuration of Engine Controller)

The engine controller 1a mainly performs feedback control based on a sprung vertical acceleration detected by a vertical acceleration sensor 15. The engine controller 1a includes a first traveling-state estimator 100 configured to estimate a stroke speed of each wheel, a bounce rate, a roll rate, and a pitch rate, which are used in skyhook control of a sprung vibration suppression control unit 101a described later, an engine attitude control unit 101 configured to calculate an engine attitude control amount serving as an engine torque command, and an engine control unit 102 configured to control an operation state of the engine 1 on the basis of the calculated engine attitude control amount. Note that, the content of estimation processing by the first traveling-state estimator 100 is described later.

The engine attitude control unit 101 includes the sprung vibration suppression control unit 101a configured to calculate a sprung control amount for suppressing the bounce movement and the pitch movement by the skyhook control, a vehicle-load control unit 101b configured to calculate a vehicle-load variation suppressed control amount for suppressing vehicle-load variation between front-wheels and rear-wheels, and an engine-side driver-input control unit 101c configured to calculate a yaw response control amount corresponding to a vehicle behavior that the vehicle driver intends to attain on the basis of a signal from the steering angle sensor 7 or the vehicle speed sensor 8. The engine attitude control unit 101 calculates an engine attitude control amount in which the control amounts calculated by these respective control units become minimum by optimal control (LQR), and outputs the final engine attitude control amount to the engine control unit 102. In this manner, the engine 1 suppresses the bounce movement and the pitch movement to allow the S/A 3 to reduce the damping force control amount, thereby making it possible to prevent the high frequency vibration from becoming worse. Moreover, because the S/A 3 can concentrate on suppressing the roll movement, the roll movement can be effectively suppressed.

(Configuration of Brake Controller)

The brake controller 2a includes a second traveling-state estimator 200 configured to estimate a stroke speed of each wheel, a pitch rate, and the like on the basis of the sprung vertical acceleration detected by the vertical acceleration sensor 15, a skyhook control unit 201 (details thereof are described later) configured to calculate a brake attitude control amount based on skyhook control on the basis of the stroke speed and the pitch rate thus estimated, and a brake control unit 202 configured to control braking torque of the brake 20 on the basis of the calculated brake attitude control amount. Note that, in the first embodiment, although the same estimation processing is employed in the first traveling-state estimator 100 and the second traveling-state estimator 200, other estimation processing may be used as long as processing of estimating from the vertical acceleration. In this manner, the brake 20 suppresses the pitch movement to allow the S/A 3 to reduce the damping force control amount, thereby making it possible to prevent the high frequency vibration from becoming worse. Moreover, because the S/A 3 can concentrate on suppressing the roll movement, the roll movement can be effectively suppressed.

(Configuration of S/A Controller)

The S/A controller 3a includes a driver-input control unit 31 configured to perform driver-input control for attaining a desired vehicle attitude on the basis of operations (steering operation, accelerator operation and brake pedal operation or the like) by the vehicle driver, a third traveling-state estimator 32 configured to estimate a traveling state on the basis of the detection values by the various kinds of sensors (mainly the sprung vertical acceleration detected by the vertical acceleration sensor 15), a sprung vibration suppression control unit 33 configured to control a sprung vibration state on the basis of the estimated traveling state, an unsprung vibration suppression control unit 34 configured to control an unsprung vibration state on the basis of the estimated traveling state, and an damping force control unit 35 configured to determine, on the basis of the shock absorber attitude control amount outputted from the driver-input control unit 31, the sprung vibration suppression control amount outputted from the sprung vibration suppression control unit 33, and the unsprung vibration suppression control amount outputted from the unsprung vibration suppression control unit 34, a damping force to be set to the S/A 3, and controls the damping force of the S/A 3. Note that, in the first embodiment, although the same estimation processing is employed as the estimation processing in the first traveling-state estimator 100, the second traveling-state estimator 200, and the third traveling-state estimator 32, other estimation processing may be used as long as estimation processing of estimating from the sprung vertical acceleration, and the estimation processing is not especially limited thereto.

Figure 3:
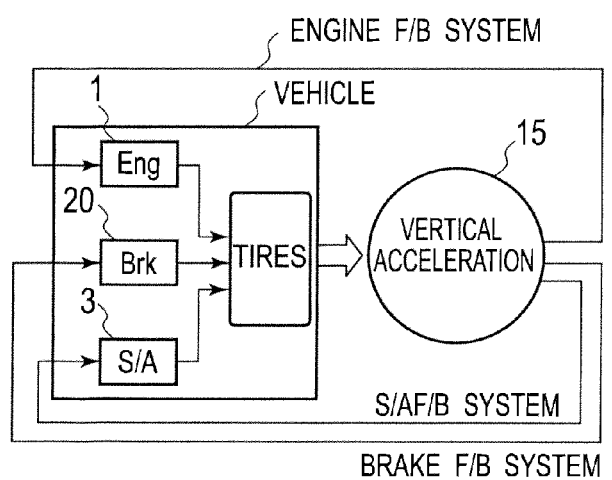
FIG. 3 is a conceptual diagram illustrating a control configuration of feedback control systems according to the first embodiment.

Here, in the first embodiment, it is decided that the feedback control system using the vertical acceleration sensor 15 is configured in all the actuators. FIG. 3 is a conceptual diagram illustrating a control configuration of the feedback control systems in the first embodiment. The engine 1, the brake 20, and the S/A 3 individually constitute an engine feedback control system, a brake feedback control system, and an S/A feedback control system, respectively. In this process, the respective actuators are individually operated without mutually monitoring the operation states, there arises a problem of control interference. However, the influence due to the control by each of the actuators appears as each vertical acceleration. Therefore, the feedback control system based on the vertical acceleration is configured in each of the actuators to mutually monitor the influence due to each control as a result, thereby preventing the control interference. For example, when certain sprung vibration is suppressed by the engine 1, the brake 20 or the S/A 3 may perform control on the basis of the vertical acceleration to which the influence is reflected even if the other actuators do not notice the control content performed by the engine 1. In other words, because the feedback control system is configured using the sprung vertical acceleration as a common value, performing individual control without mutually monitoring in a control manner results in performing control (hereinafter, this control is described as cooperative control) due to mutual monitoring. This allows the vehicle attitude to be converged in the stabilization direction. Hereinafter, the respective feedback control systems are explained successively.

(Traveling-tate Estimator)

Firstly, the first, the second, and the third traveling-state estimators which have the common configuration provided in the respective feedback control systems are explained. In the first embodiment, the same estimation processing is employed as the estimation processing in the first traveling-state estimator 100, the second traveling-state estimator 200, and the third traveling-state estimator 32. Accordingly, because the processing in the respective estimators is common, the estimation processing in the third traveling-state estimator 32 is explained as a representative. Note that, these respective traveling-state estimators may be provided with separate estimation models as long as state estimation using the sprung vertical acceleration, an estimation model is not especially limited.

Figure 4:
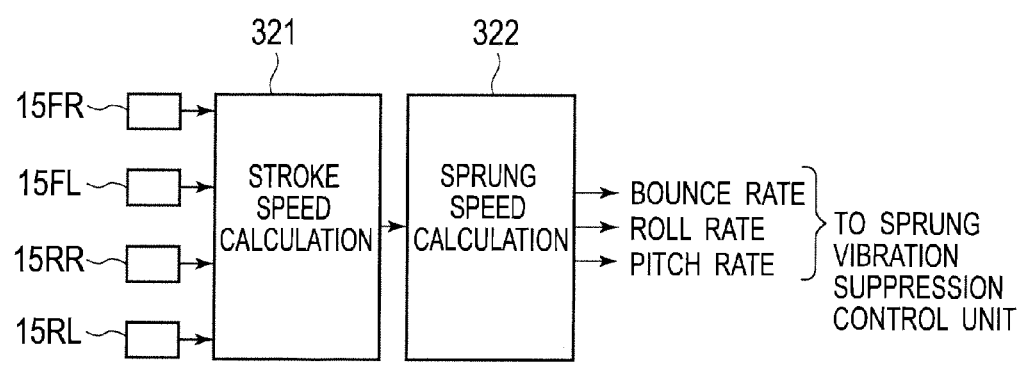
FIG. 4 is a control block diagram illustrating a control configuration of a traveling-state estimator according to the first embodiment.

FIG. 4 is a control block diagram illustrating a control configuration of the third traveling-state estimator in the first embodiment. The third traveling-state estimator 32 in the first embodiment calculates a stroke speed basically on the basis of the sprung vertical acceleration detected by the vertical acceleration sensor 15. Moreover, the third traveling-state estimator 32 calculates, on the basis of the stroke speeds and the sprung vertical acceleration, a bounce rate, a roll rate, and a pitch rate, which are used for the skyhook control by the sprung vibration suppression control unit 33 described later. Firstly, each value of the vertical acceleration sensor 15 of each wheel is inputted to a stroke speed calculation unit 321, and the stroke speed calculation unit 321 calculates a stroke speed of each wheel. Next, a sprung speed calculation unit 322 calculates a bounce rate, a roll rate, and a pitch rate.

(Estimation Model)

The skyhook control sets a damping force on the basis of the relation between the stroke speed and the sprung speed of the S/A 3 to perform sprung attitude control, thereby attaining a flat traveling state. Here, in order to attain the sprung attitude control by the skyhook control, it is required to feedback the sprung speed or the stroke speed. Now, the sprung speed is a value that the vertical acceleration sensor 15 can detect, and the stroke speed needs to be estimated using the estimation model. Hereinafter, a problem of the estimation model and the model configuration to be employed is explained.

Figure 5A:
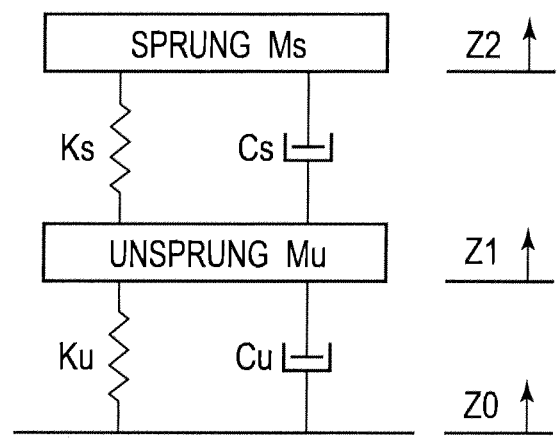
FIG. 5A is a schematic view illustrating vehicle body vibration model which is provided with a shock absorber of a constant damping force.
Figure 5B:
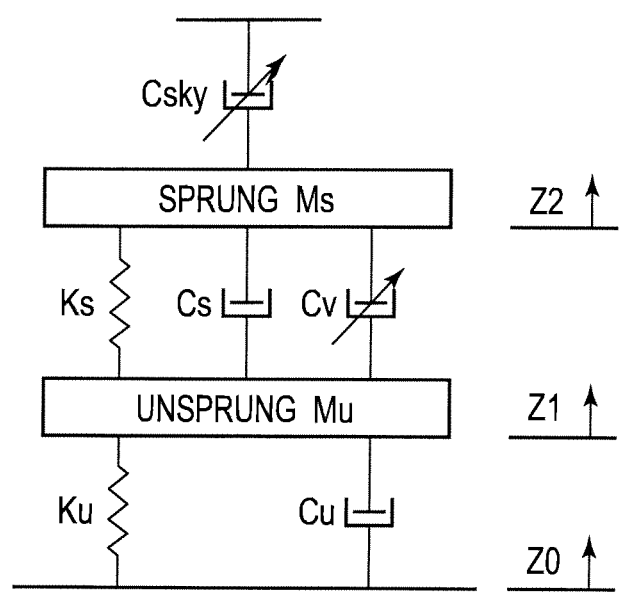
FIG. 5B is a schematic view illustrating vehicle body vibration model which is provided with a shock absorber of a variable damping force and performs skyhook control.

FIGS. 5A and 5B are schematic views illustrating a vehicle body vibration model. FIG. 5A illustrates a model of the vehicle which is provided with an S/A of a constant damping force (hereinafter, described as conventional vehicle), and FIG. 513 shows a model of the vehicle which is provided with an S/A of a variable damping force and performs skyhook control. In FIGS. 5A and 5B, Ms represents a sprung mass, Mu represents a unsprung mass, Ks represents an elastic coefficient of a coil spring, Cs represents a damping coefficient of the S/A, Ku represents an elastic coefficient of an unsprung portion (tire), Cu represents a damping coefficient of the unsprung portion (tire), and Cv represents a variable damping coefficient. Moreover, z2 represents a sprung position, z1 represents an unsprung position, and z0 represents a road surface position.

When the conventional vehicle model shown in FIG. 5A is used, the equation of motion with respect to the sprung portion is represented as follows. Note that, dzl represents first order differentiation of z1 (that is speed), and ddz1 represents second order differentiation thereof (that is acceleration).

$$Ms \cdot ddz2 = -Ks \cdot (z2-z1) - Cs \cdot (dz2-dz1) \quad \text{(Estimate Equation 1)}$$

The relational expression which is subjected to Laplace transform and simplified is expressed as follows.

$$dz2 = -(1/Ms) \cdot (1/s^2) \cdot (Cs \cdot s + Ks) \cdot (dz2-dz1) \quad \text{(Estimate Equation 2)}$$

Here, because dz2−dz1 is the stroke speed (Vz_sFL, Vz_sFR, Vz_sRL, and Vz_sRR), the stroke speed can be calculated from the sprung speed. However, change of a damping force by the skyhook control remarkably lowers the estimation accuracy. This raises a problem that a large attitude control force (damping force change) cannot be applied by the conventional vehicle model.

Therefore, it can be considered that the vehicle model by the skyhook control such as that shown in FIG. 5B is used. Change of a damping force basically means to change a force of limiting the piston traveling speed of the S/A 3 with the suspension stroke. Because a semi-active S/A 3 which cannot actively move the piston toward a desired direction is used, a semi-active skyhook model is employed to obtain a sprung speed. An equation is expressed as follows.

$$dz2 = -(1/Ms) \cdot (1/s^2) \cdot \{(Cs+Cv) \cdot s + Ks\} \cdot (dz2-dz1) \quad \text{(Estimate Equation 3)}$$

Provided that,
when $dz2 \cdot (dz2-dz1) \geq 0$, $Cv = Csky \cdot \{dz2/(dz2-dz1)\}$, and
when $dz2 \cdot (dz2-dz1) < 0$, $Cv = 0$.

In other words, Cv becomes a discontinuous value.

Now, when considering that estimation of the sprung speed using a simple filter is intended, with the semi-active skyhook model, the suitable estimation accuracy cannot be obtained because if this model is seen as a filter, each variable corresponds to a filter coefficient, the pseudo differential term $\{(Cs+Cv) \cdot s + Ks\}$ contains the discontinuous variable damping coefficient Cv, whereby causing an unstable filter response. In particular, the unstable filter response causes a shift phase. The loss of the correspondence relation between the phase and the code of the sprung speed does not allow the skyhook control to be attained. Therefore, even if the semi-active S/A 3 is used, it is decided that a sprung speed is estimated using an active skyhook model which does not depend on the code relation between the sprung speed and the stroke speed, and is possible to directly use Csky with stability. The active skyhook model is employed to obtain a relation between the sprung speed dz2 and the stroke speed (dz2−dz1). An equation is expressed as follows.

$$dz2 = (1/s) \cdot \{1/(s + Csky/Ms)\} \cdot \{(Cs/Ms) \cdot s + (Ks/Ms)\} \cdot (dz2 - dz1) \quad \text{(Estimate Equation 4)}$$

In this case, no discontinuity arises in the pseudo differential term $\{(Cs/Ms) \cdot s + (Ks/Ms)\}$, and the term of $\{1/(s + Csky/Ms)\}$ can be configured by a low-pass filter. Accordingly, a filter response becomes stable, which makes it possible to obtain a suitable estimation accuracy. Note that, here, even employing the active skyhook model, because only the semi-active control is actually possible, a controllable region becomes half. Accordingly, the magnitude of the stroke speed to be estimated is smaller than the actual speed in the frequency band equal to or less than the sprung resonance. However, this does not cause a problem because the phase is most important in the skyhook control, the skyhook control is attained as long as the correspondence relation between the phase and the code can be maintained, and the magnitude of the stroke speed is adjustable with other coefficients or the like.

It can be understood that obtaining the sprung speed of each wheel with the above relations allows a stroke speed to be estimated. Next, because the vehicle is actually not one-wheeled but four-wheeled, it is examined that a sprung state is estimated using the stroke speed of each wheel by modal decomposition to components of the roll rate, the pitch rate, and the bounce rate. Now, when the abovementioned three components are calculated from the stroke speeds of the four wheels, one component corresponding thereto is lacking to cause a solution to be indefinite. Accordingly, it is decided that a wrap rate showing motion of diagonal wheels is introduced. When the bounce term of the stroke amount is xsB, the roll term thereof is xsR, the pitch term thereof is xsP, the wrap term thereof is xsW, and stroke amounts corresponding to Vz_sFL, Vz_sFR, Vz_sRL, and Vz_sRR are z_sFL, z_sFR, z_sRL, and z_sRR, the following equation is established.

$$\begin{Bmatrix} z\_sFL \\ z\_sFR \\ z\_sRL \\ z\_sRR \end{Bmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix} \quad \text{(Equation 1)}$$

$$\begin{Bmatrix} xsB \\ xsR \\ xsP \\ xsW \end{Bmatrix} \Rightarrow \begin{Bmatrix} xsB \\ xsR \\ xsP \\ xsW \end{Bmatrix} \begin{bmatrix} 1 & 1 & -1 & -1 \\ 1 & -1 & -1 & 1 \\ 1 & 1 & 1 & 1 \\ 1 & -1 & 1 & -1 \end{bmatrix}^{-1} \begin{Bmatrix} z\_sFL \\ z\_sFR \\ z\_sRL \\ z\_sRR \end{Bmatrix}$$

From the relational expression described above, differentiation dxsB and such of xsB, xsR, xsP, and xsW are expressed by the following equations.

$$dxsB = (1/4) \cdot (Vz\_sFL + Vz\_sFR + Vz\_sRL + Vz\_sRR)$$

$$dxsR = (1/4) \cdot (Vz\_sFL - Vz\_sFR + Vz\_sRL - Vz\_sRR)$$

$$dxsP = (1/4) \cdot (-Vz\_sFL - Vz\_sFR + Vz\_sRL + Vz\_sRR)$$

$$dxsW = (1/4) \cdot (-Vz\_sFL + Vz\_sFR + Vz\_sRL - Vz\_sRR)$$

Here, the relation between the sprung speed and the stroke speed is obtained from Estimate Equation 4 described above. Accordingly, in Estimate Equation 4, when the portion of $-(1/s) \cdot \{1/(s + Csky/Ms)\} \cdot \{(Cs/Ms) \cdot s + (Ks/Ms)\}$ is described as G, values by considering respective modal parameters (CskyB, CskyR, CskyP, CsB, CsR, CsP, KsB, KsR, KsP) in accordance with the bounce terms, the roll terms, and the pitch terms of Csky, Cs, and Ks are GB, GR, and GP, each bounce rate is dB, each roll rate is dR, and each pitch rate is dP, dB, dR, and dP can be calculated as the following values.

$$dB = GB \cdot dxsB$$

$$dR = GR \cdot dxsR$$

$$dP = GP \cdot dxsP$$

From the above, estimation of a stroke speed or the sprung state can be attained on the basis of the sprung vertical acceleration of each wheel.

(Sprung Vibration Suppression Control Unit)

Next, the configuration of the skyhook control executed in the sprung vibration suppression control unit 101a, the skyhook control unit 201, and the sprung vibration suppression control unit 33 is explained. In the skyhook control, the sprung state estimated on the basis of the sprung vertical acceleration as described the above is controlled in such a manner to be a target sprung state. In other words, when the sprung states such as the bounce, the roll, and the pitch are controlled to be target sprung states, the detected sprung vertical acceleration is controlled in such a manner to be the sprung vertical acceleration corresponding to the target sprung state.

[Configuration of Skyhook Control Unit]

The control apparatus for a vehicle in the first embodiment is provided with three actuators of the engine 1, the brake 20, and the S/A 3 as actuators for attaining sprung attitude control. Among these actuators, the two rates of the bounce rate and the pitch rate are set as control objects in the sprung vibration suppression control unit 101a in the engine controller 1a, the pitch rate is set to a control object in the skyhook control unit 201 in the brake controller 2a, and the three rates of the bounce rate, the roll rate, and the pitch rate are set as control objects in a skyhook control unit 33a in the S/A controller 3a.

A skyhook control amount in the bounce direction is obtained by FB=CskyB·dB, a skyhook control amount in the roll direction is obtained by FR=CskyR·dR, and a skyhook control amount in the pitch direction is obtained by FP=CskyP·dP.

(Skyhook Control Amount FB in Bounce Direction)

The skyhook control amount FB in the bounce direction is calculated as a part of the engine attitude control amount in the sprung vibration suppression control unit 101a, and is also calculated as a part of the S/A attitude control amount in the skyhook control unit 33a.

(Skyhook Control Amount FR in Roll Direction)

The skyhook control amount FR in the roll direction is calculated as a part of the S/A attitude control amount in the skyhook control unit 33a.

(Skyhook Control Amount FP in Pitch Direction)

The skyhook control amount FP in the pitch direction is calculated as a part of the engine attitude control amount in the sprung vibration suppression control unit 101a, and is also calculated as the brake attitude control amount in the skyhook control unit 201. Alternatively, the skyhook control amount FP in the pitch direction is calculated as a part of the S/A attitude control amount in the skyhook control unit 33a.

In the engine attitude control unit 101, set is a limit value for limiting an engine torque control amount in accordance with the engine attitude control amount in order that no discomfort feeling is given to the vehicle driver. This limits the engine torque control amount when being converted into a longitudinal acceleration to be within a predetermined range of longitudinal acceleration. Accordingly, the engine attitude control unit 101 calculates an engine attitude control amount (engine torque control amount) on the basis of the FB or the FP, and outputs, when the value thus calculated is the limit value or higher, the engine attitude control amount as a skyhook control amount of the bounce rate or the pitch rate which can be attained by the limit value. The engine control unit 102 calculates an engine torque control amount on the basis of the engine attitude control amount corresponding to the limit value, and outputs the engine torque control amount to the engine 1.

In the skyhook control unit 201, similar to the engine 1, set is a limit value for limiting a braking torque control amount in order that no discomfort feeling is given to the vehicle driver (note that, details of the limit value are described later). This limits the braking torque control amount when being converted into a longitudinal acceleration to be within a predetermined range of longitudinal acceleration (the limit value obtained based on the discomfort feeling of the occupant, the lifetime of the actuator, or the like). Accordingly, the skyhook control unit 201 calculates a brake attitude control amount on the basis of the FP, and outputs, when the value thus calculated is the limit value or higher, a pitch rate signal suppressing amount which can be attained by the limit value (hereinafter, described as the brake attitude control amount) to the brake control unit 202. The brake control unit 202 calculates a braking torque control amount (or deceleration) on the basis of the brake attitude control amount corresponding to the limit value, and outputs the braking torque control amount to the brake 20.

[Brake Pitch Control]

Figure 6:
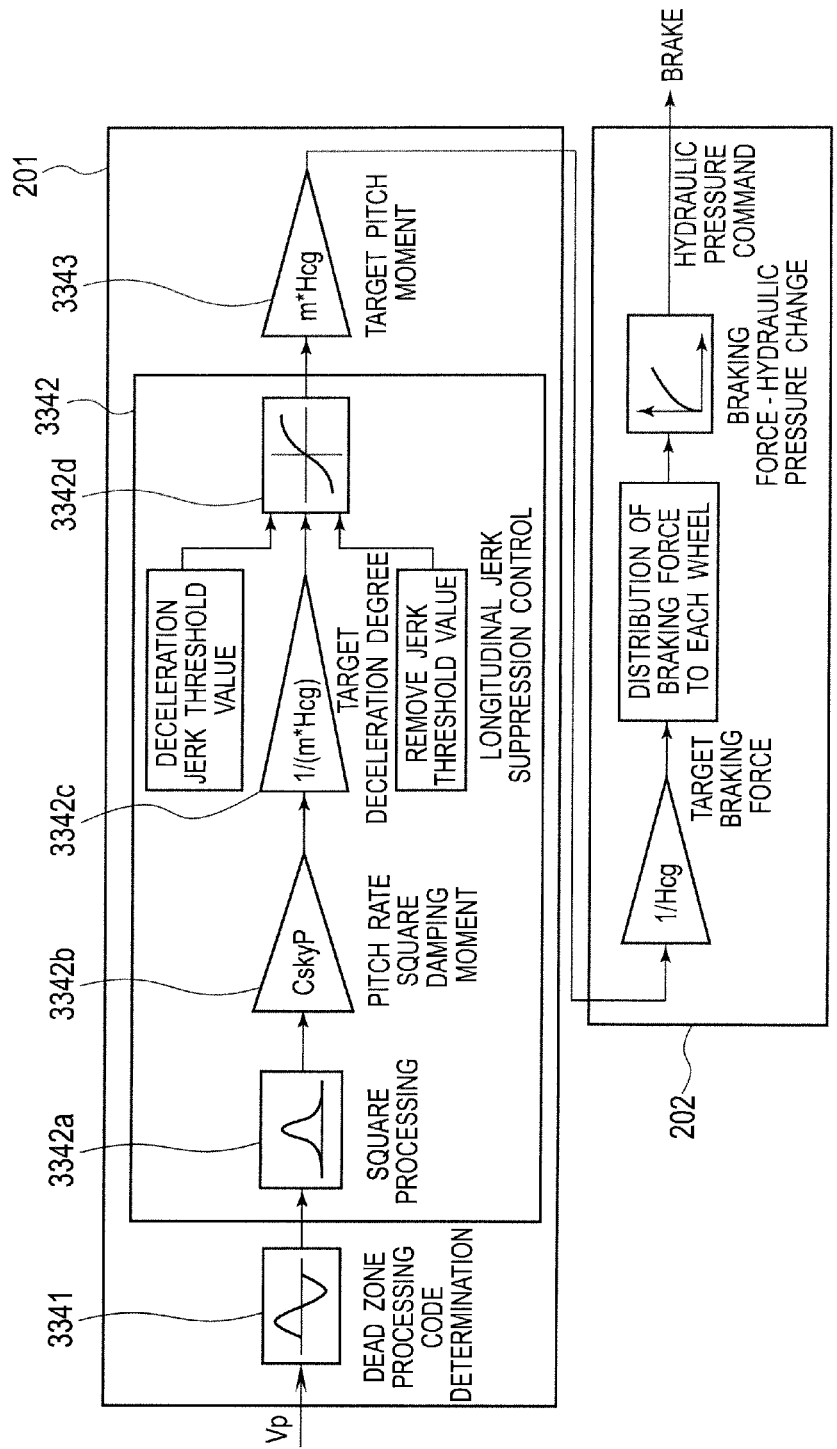
FIG. 6 is a control block diagram illustrating brake pitch control according to the first embodiment.

Here, brake pitch control is explained. Generally, because the brake 20 can control both of the bounce and the pitch, it can be also said that the brake 20 may preferably control the both. However, the bounce control by the brake 20 had a tendency to give the vehicle driver a discomfort feeling. This is because the bounce control by the brake 20 generates braking forces simultaneously to the four wheels in the direction with the low control priority to cause the strong sense of deceleration regardless of difficulty in obtaining a control effect. Therefore, the configuration specialized in the pitch control is employed in the brake 20. FIG. 6 is a control block diagram illustrating brake pitch control in the first embodiment. When a mass of the vehicle body is m, a front-wheel braking force is BFf, a rear-wheel braking force is BFr, a height between the vehicle gravity center and the road surface is Hcg, and an acceleration of the vehicle is a, a pitch moment is Mp, and a pitch rate is Vp, the following relational expression is established.

$$BFf + BFr = m \cdot a$$

$$m \cdot a \cdot Hcg = Mp$$

$$Mp = (BFf + BFr) \cdot Hcg$$

Here, if the braking force is applied when the pitch rate Vp is positive, that is, when the front-wheel side is depressed, the front-wheel side is further depressed to promote the pitch motion. Accordingly, in this case, no braking force is applied. In contrast, when the pitch rate Vp is negative, that is, the front-wheel side is lifted, the braking pitch moment applies a braking force to suppress the front-wheel side from being lifted. This secures a field of vision of the vehicle driver, and allows the vehicle driver to easily see the forward to contribute to improve the sense of security and the sense of flatness. From the above, the control amounts below are applied.

when Vp>0 (front wheels are depressed), Mp=0
when Vp≤0 (front wheels are lifted), Mp=CskyP·Vp Accordingly, braking torque is generated only when the front side of the vehicle body is lifted. This enables the reduced deceleration to be generated compared with a case where braking torque is generated in both of the cases where the front side of the vehicle body is lifted and depressed. Moreover, only a half of the frequency of actuator operations is needed, thereby making it possible to employ the low-cost actuator.

On the basis of the above relation, the skyhook control unit 201 and the brake control unit 202 (hereinafter, referred to as a brake attitude control amount calculation unit 334) includes the following control blocks. A dead zone processing code determining unit 3341 determines the inputted code of the pitch rate Vp to output 0 to a deceleration sense reducing processor 3342 if the code is positive because no control is required, and outputs a pitch rate signal to the deceleration sense reducing processor 3342 if the code is negative because it is determined that control is possible.

[Deceleration Sense Reducing Processing]

Next, deceleration sense reducing processing is explained. This processing corresponds to the limiting processing by the abovementioned limit value performed in the brake attitude control amount calculation unit 334. In a square processor 3342*a*, the pitch rate signal is square processed. This reverses the code and smoothes the start of a control force. A pitch rate square damping moment calculation unit 3342*b* calculates a pitch moment Mp by multiplying the square processed pitch rate by the skyhook gain CskyP of the pitch term to which the square processing is considered. A target deceleration calculating unit 3342*c* calculates a target deceleration by dividing the pitch moment Mp by the mass m and the height Hcg between the vehicle gravity center and the road surface.

A jerk threshold value limiting unit 3342*d* determines whether or not the change rate of the calculated target deceleration, that is, a jerk is within the ranges of the deceleration jerk threshold value and the remove jerk threshold value which are set in advance, and the target deceleration is within the range of the longitudinal acceleration limit value. If the jerk exceeds either of the threshold values, the target deceleration is corrected to be a value within the range of the jerk threshold value, and if the target deceleration exceeds the limit value, the target deceleration is set within the range of the limit value. This allows a deceleration to be generated in such a manner that no discomfort feeling is given to the vehicle driver.

A target pitch moment conversion unit 3343 calculates a target pitch moment by multiplying the target deceleration limited in the jerk threshold value limiting unit 3342*d* by the mass m and the height Hcg, and outputs the target pitch moment to the brake controller 2*a*.

[Frequency-sensitive Control Unit]

Next, frequency-sensitive control processing in the sprung vibration suppression control unit is explained. In the first embodiment, the sprung vibration suppression control is attained by estimating a sprung speed basically on the basis of the detection value by the vertical acceleration sensor 15 and performing the skyhook control based on the sprung speed. However, there may be a case where it can be considered that the vertical acceleration sensor 15 may not assure the sufficient estimation accuracy, or a case where depending on the traveling status or the intention by the vehicle driver, a comfortable traveling state (not the sense of flatness of the vehicle body but a gentler and comfortable ride) is intended to be actively assured. In this case, a slight phase displacement might cause difficulty of adequate control in vector control in which the relation (phase or the like) between the codes of the stroke speed and the sprung speed such as the skyhook control. Accordingly, frequency-sensitive control that is sprung vibration suppression control in accordance with the scalar quantity of vibration characteristics has been decided to be introduced.

Figure 7:
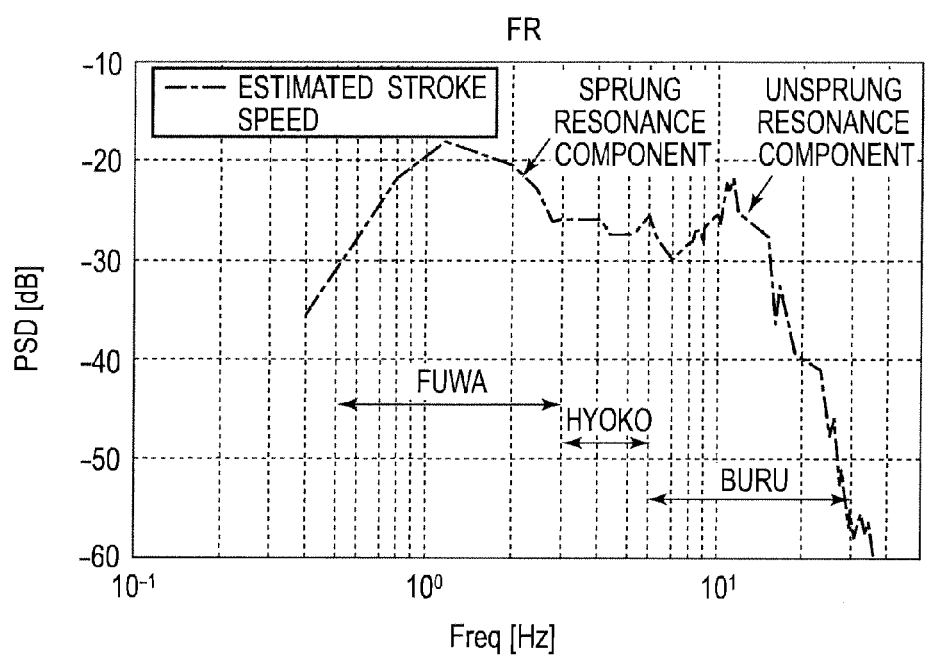
FIG. 7 is a graph illustrating a frequency characteristic of an estimated stroke speed.

FIG. 7 is a graph illustrating a frequency characteristic of an estimated stroke speed. The frequency characteristic is a characteristic in which a longitudinal axis indicates the magnitude of the amplitude with respect to the frequency as a scalar quantity. Here, a region where a sprung resonance frequency component is present is defined as a frequency region fuwa (0.5 to 3 Hz), a region between a sprung resonance frequency component and an unsprung resonance frequency component is defined as a frequency region hyoko (3 to 6 Hz), and a region where an unsprung resonance frequency component is present is defined as a frequency region buru (6 to 23 Hz). The frequency region fuwa is a frequency region which brings a sense of an occupant being thrown away in the air because the entire body of the occupant is swung, in other words, a sense such that the gravitational acceleration acting on the occupant is decreased. The frequency region hyoko is a frequency region which brings not the sense of the gravitational acceleration being decreased but a sense such that a human body is jumped up bit by bit at a trot of the horse riding, in other words, which brings the vertical movement that the entire body can follow. The frequency region burn is a frequency region where not the vertical movement that the mass of a human body can follow but vibration bit by bit is transmitted to a part of the body such as thighs of the occupant.

Figure 8:
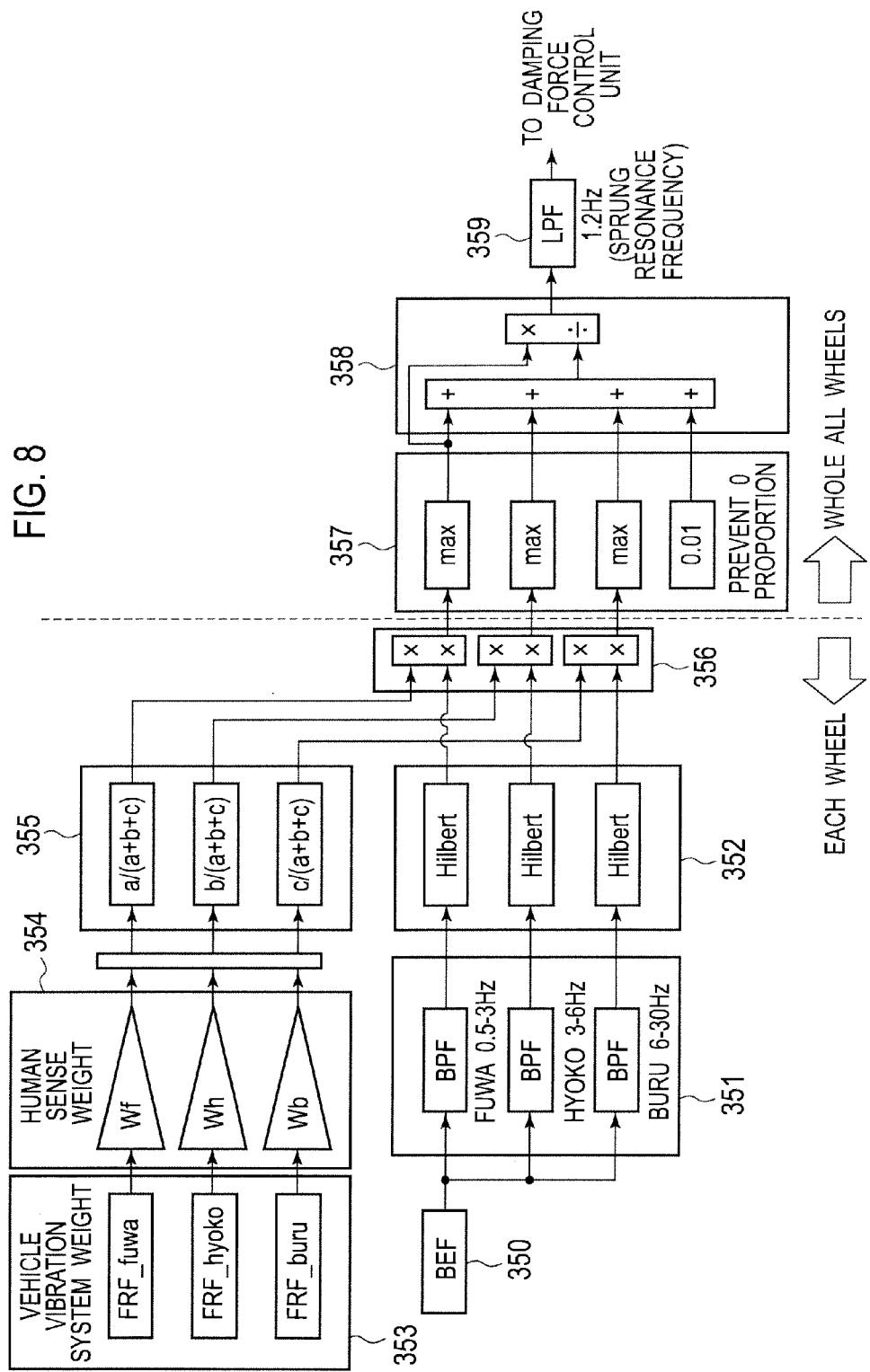
FIG. 8 is a control block diagram illustrating frequency-sensitive control in sprung vibration suppression control according to the first embodiment.

FIG. 8 is a control block diagram illustrating frequency-sensitive control in the sprung vibration suppression control in the first embodiment. A band elimination filter 350 cuts a noise other than the vibration component used for this control in the estimated stroke speed. A predetermined frequency region dividing unit 351 divides the value into the respective frequency bands of the frequency region fuwa, the frequency region hyoko, and the frequency region buru. A Hilbert transformation processor 352 Hilbert transforms the divided frequency bands to convert into scalar quantities (specifically, an area calculated from the amplitude and the frequency band) based on the amplitude of the frequency.

A vehicle vibration system weight setting unit 353 sets weights with which vibrations of the respective frequency bands of the frequency region fuwa, the frequency region hyoko, and the frequency region buru are actually propagated to the vehicle. A human sense weight setting unit 354 sets weights with which vibrations of the respective frequency bands of the frequency region fuwa, the frequency region hyoko, and the frequency region buru are propagated to the occupant.

Figure 9:
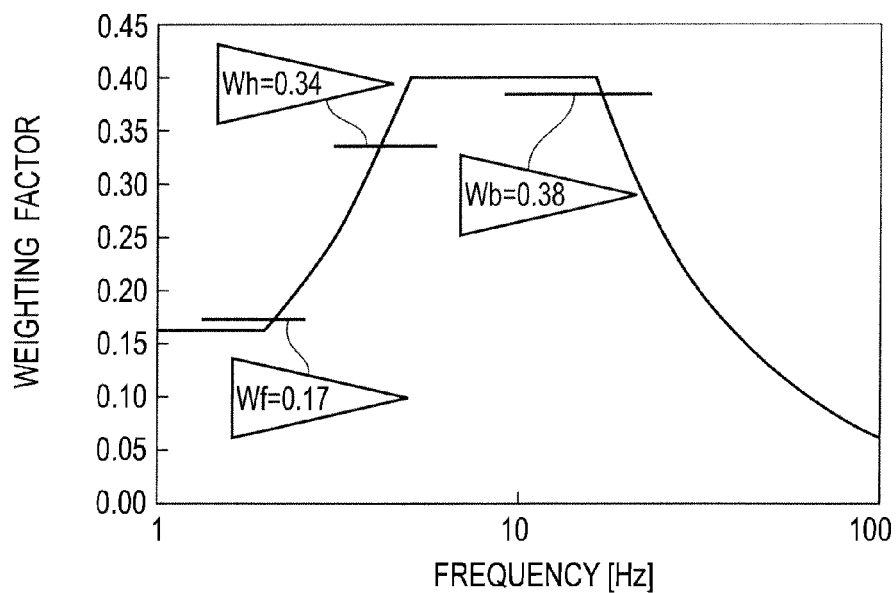
FIG. 9 is a correlation graph illustrating a human sense characteristic in each frequency region.

Here, setting a human sense weight is explained. FIG. 9 is a correlation graph illustrating a human sense characteristic with respect to the frequency. As shown in FIG. 9, in the frequency region fuwa serving as a low frequency region, the sensitivity of the occupant with respect to the frequency is comparatively low. The sensitivity gradually increases as being moved in the higher-frequency region. Note that, the frequency is less likely to be transmitted to the occupant in the frequency region equal to or higher than the frequency region buru. From the above, a human sense weight Wf in the frequency region fuwa is set to 0.17, a human sense weight Wh in the frequency region hyoko is set to 0.34 which is larger than the Wf, and a human sense weight Wb in the frequency region buru is set to 0.38 which is further larger than the Wf and the Wh. This enables the correlation between the scalar quantity of each of the frequency bands and the vibration actually propagated to the occupant to increase. Note that, these two weight coefficients may be changed as appropriate in accordance with the concept of the vehicle or the preferences of the occupant.

A weight deciding unit 355 calculates a ratio in which a weight of each frequency band is occupied, out of weights of the respective frequency bands. When a weight of the frequency region fuwa is a, a weight of the frequency region hyoko is b, and a weight of the frequency region buru is c, a weight coefficient of the frequency region fuwa is (a/(a+b+c)), a weight coefficient of the frequency region hyoko is (b/(a+b+c)), and a weight coefficient of the frequency region buru is (c/(a+b+c)).

A scalar quantity calculation unit 356 outputs each final scalar quantity by multiplying the scalar quantity of each of the frequency bands calculated by the Hilbert transformation processor 352 by each of the weights calculated by the weight deciding unit 355. The foregoing processing is performed with respect to the estimated stroke speed of each wheel.

A maximum value selection unit 357 selects the maximum value among the final scalar quantities calculated for the respective four wheels. Note that, 0.01 at the bottom portion is set to prevent the denominator from becoming 0 because the total of maximum values is set as the denominator in the following processing. A rate calculation unit 358 calculates a rate by serving the total of the maximum values of the scalar quantities in the respective frequency bands as the denominator, and the maximum value of the scalar quantities in the frequency band corresponding to the frequency region fuwa as the numerator. In other words, a mixing rate (hereinafter, described as simply a rate) of the frequency region fuwa included in the whole vibration components is calculated. A sprung resonance filter 359 performs filter processing of the sprung resonance frequency at approximately 1.2 Hz with respect to the calculated rate to extract a component of the sprung resonance frequency band showing the frequency region fuwa from the calculated rate. In other words, because the frequency region fuwa is present at approximately 1.2 Hz, it can be considered that the rate of this region may change at approximately 1.2 Hz. In addition, the sprung resonance filter 359 outputs the eventually extracted rate to the damping force control unit 35, and the frequency-sensitive damping force control amount in accordance with the rate is outputted.

Figure 10:
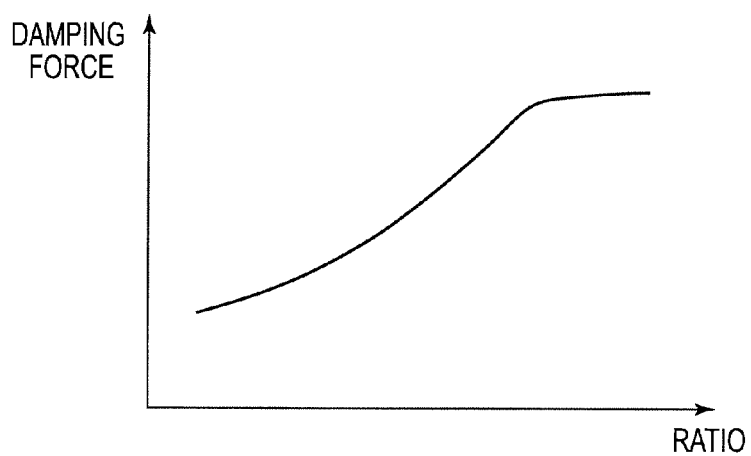
FIG. 10 is a characteristic graph illustrating a relation between a vibration mixing rate of a frequency region fuwa by frequency-sensitive control and a damping force according to the first embodiment.

FIG. 10 is a characteristic graph illustrating a relation between the vibration mixing rate of the frequency region fuwa by the frequency-sensitive control and the damping force in the first embodiment. As shown in FIG. 10, setting a higher damping force when the rate of the frequency region fuwa is high reduces a sprung resonance vibration level. In this process, because the rate of the frequency region hyoko or the frequency region buru is low, even if a higher damping force is set, high frequency vibration or vibration such that a human body is jumped up bit by bit at a trot of the horse riding is not transmitted to the occupant. In contrast, when the rate of the frequency region fuwa is low, setting a lower damping force decreases vibration transmission characteristic equal to or higher than the sprung resonance. Accordingly, the high frequency vibration is suppressed, thereby obtaining a smooth ride.

Figure 11:
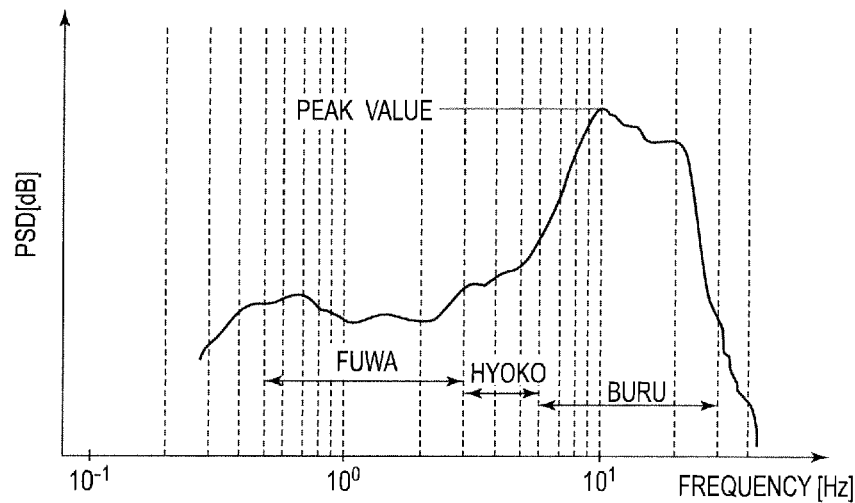
FIG. 11 is a graph illustrating a frequency characteristic of an estimated stroke speed in a certain traveling condition.

Here, an advantage of the frequency-sensitive control when the frequency-sensitive control is compared with the skyhook control is explained. FIG. 11 is a graph illustrating a frequency characteristic of the estimated stroke speed in a certain traveling condition. This is a characteristic shown in a case where the vehicle is traveling on a road surface with continuous small recesses and projections especially such as a stone-paved road. If performing the skyhook control during traveling on the road surface showing such a characteristic, a damping force is decided at a peak value of the amplitude in the skyhook control. Accordingly, the worse estimation of phase with respect to inputs of the high frequency vibration results in an extremely high damping force to be set at the wrong timing, thereby causing a problem that the high frequency vibration becomes worse.

In contrast, in a case of the control such as the frequency-sensitive control on the basis of the scalar quantity not the vector, a low damping force is set on the road surface as shown in FIG. 11 because the rate of the frequency region fuwa is small. Accordingly, even when the amplitude of vibration in the frequency region buru is large, the vibration transmission characteristic sufficiently decreases, thereby making it possible to prevent the high frequency vibration from becoming worse. From the above, in a region where the skyhook control is difficult to be performed because the phase estimation accuracy becomes worse even if a costly sensor or the like is provided, the high frequency vibration can be suppressed by the frequency-sensitive control based on the scalar quantity.

(S/A-Side Driver-input Control Unit)

Next, the S/A-side driver-input control unit is explained. The S/A-side driver-input control unit 31 calculates a driver input damping force control amount corresponding to a vehicle behavior that the vehicle driver intends to attain on the basis of a signal from the steering angle sensor 7 or the vehicle speed sensor 8, and outputs the driver input damping force control amount to the damping force control unit 35. For example, while the vehicle driver is turning a vehicle, if the nose side of the vehicle is lifted, the field of vision of the vehicle driver is likely to be out of the road surface. Accordingly, in this case, the S/A-side driver-input control unit 31 outputs the damping force of four wheels as a driver input damping force control amount to prevent the nose from being lifted. Moreover, the S/A-side driver-input control unit 31 outputs a driver input damping force control amount for suppressing the roll generated during the turning.

(Roll Control By S/A-Side Driver-input control)

Figure 12:
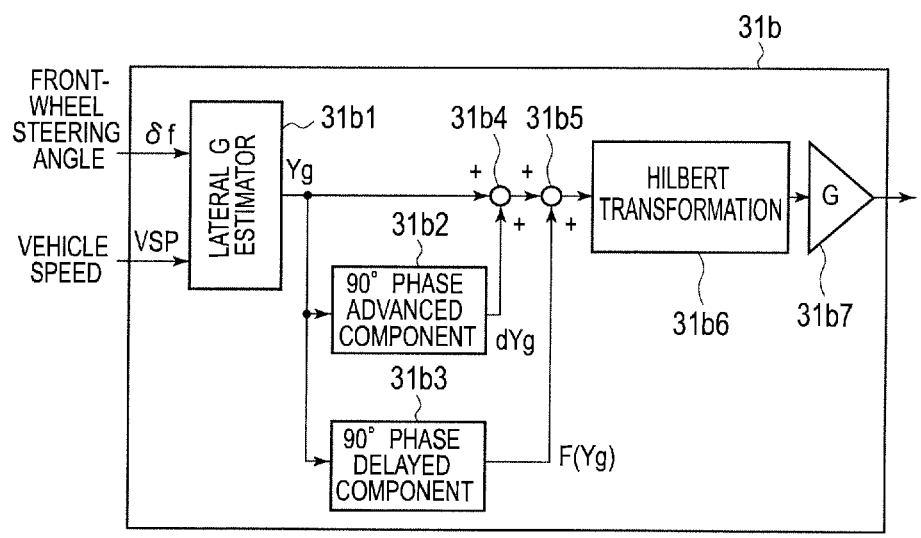
FIG. 12 is a control block diagram illustrating a control configuration of roll rate suppression control according to the first embodiment.

Here, roll suppression control performed in the S/A-side driver-input control is explained. FIG. 12 is a control block diagram illustrating a control configuration of roll rate suppression control in the first embodiment. A lateral acceleration estimator 31*b*1 estimates a lateral acceleration Yg on the basis of a front-wheel steering angle δf detected by the steering angle sensor 7 and a vehicle speed VSP detected by the vehicle speed sensor 8. The lateral acceleration Yg is calculated by the following equation on the basis of a vehicle body plan view model.

$$Yg=(VSP^2/(1+A \cdot VSP^2)) \cdot \delta f$$

Here, A is a predetermined value.

A 90° phase advanced component creation unit 31*b*2 outputs a lateral acceleration differential value dYg by differentiation of the estimated lateral acceleration Yg. A first addition unit 31*b*4 adds the lateral acceleration Yg to the lateral acceleration differential value dYg. A 90° phase delayed component creation unit 31*b*3 outputs a component F (Yg) in which the phase of the estimated lateral acceleration Yg is delayed by 90° (ninety degrees). A second addition unit 31*b*5 adds the F(Yg) to the value added in the first addition unit 31*b*4. A Hilbert transformation unit 31*b*6 calculates a scalar quantity based on an envelope waveform of the added value. A gain multiply unit 31*b*7 multiplies the scalar quantity based on the envelope waveform by the gain to calculate a driver input attitude control amount for the roll rate suppression control, and outputs the driver input attitude control amount for the roll rate suppression control to the damping force control unit 35.

Figure 13:
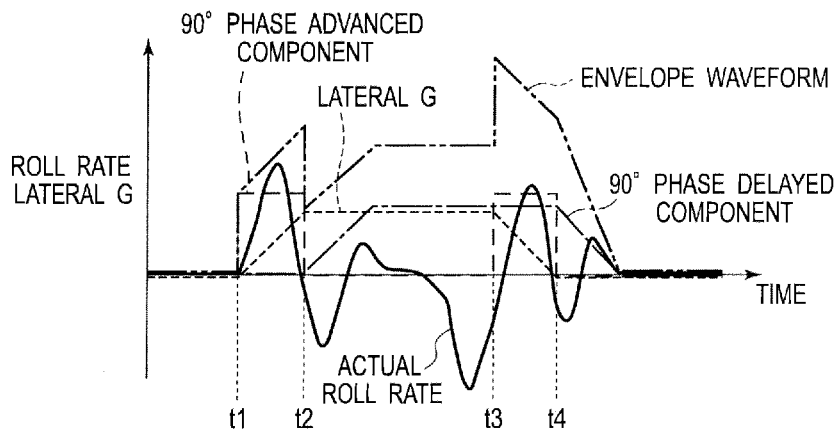
FIG. 13 is a time chart illustrating envelope waveform forming processing in the roll rate suppression control according to the first embodiment.

FIG. 13 is a time chart illustrating envelope waveform forming processing in the roll rate suppression control in the first embodiment. When a vehicle driver starts steering at time t1, the roll rate gradually starts to be generated. In this process, a 90° phase advanced component is added to form an envelope waveform, and a driver input attitude control amount is calculated on the basis of the scalar quantity based on the envelope waveform, thereby making it possible to suppress the roll rate from generating at the initial steering. Next, at time t2, when the vehicle driver is in a steady steering state, no 90° phase advanced component is present, and the phase delayed component F(Yg) is added at this time. In this process, even if the roll rate itself does not change so much in the steady turning state, after once being rolled, the roll rate resonance component corresponding to the sway-back of rolling is generated. If no phase delayed component F(Yg) is added, a small value is set as the damping force from at time t2 to at time t3. This might cause instability of the vehicle behavior due to the roll rate resonance component. In order to suppress this roll rate resonance component, the 90° phase delayed component F(Yg) is applied.

At time t3, when the state of the vehicle driver is moved from a steering-retaining state to a straight ahead traveling state, the lateral acceleration Yg becomes smaller and the roll rate is also converged to a smaller value. Also here, the effect of the 90° phase delayed component F(Yg) steadily secures the damping force, thereby making it possible to prevent the instability due to the roll rate resonance component.

(Unsprung Vibration Suppression Control Unit)

Next, a configuration of the unsprung vibration suppression control unit is explained. As explained in the conventional vehicle of FIG. 5A, the resonance frequency band is present because tires also include the elastic coefficient and the damping coefficient. However, the mass of the tire is smaller than the sprung mass and the elastic coefficient thereof is also high, the unsprung resonance is present at the higher frequency side than the sprung resonance. This unsprung resonance component causes the tires to be flapping in the unsprung portion, and the road holding might become worse. Moreover, the flapping in the unsprung portion might give the occupant an unpleasant feeling. Therefore, in order to suppress the flapping due to the unsprung resonance, a damping force in accordance with the unsprung resonance component is set.

Figure 14:
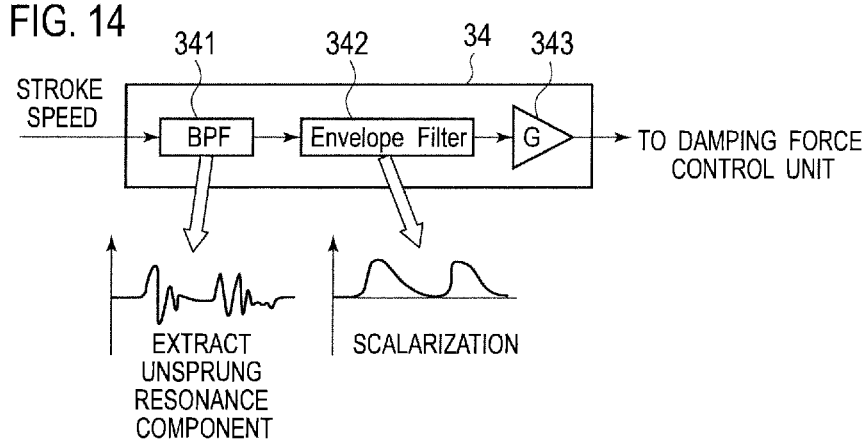
FIG. 14 is a block diagram illustrating a control configuration of unsprung vibration suppression control according to the first embodiment.

FIG. 14 is a block diagram illustrating a control configuration of unsprung vibration suppression control in the first embodiment. An unsprung resonance component extract unit 341 causes a band-pass filter to act on the stroke speed outputted from the traveling-state estimator 32 to extract an unsprung resonance component. The unsprung resonance component is extracted from a region of approximately 10 to 20 Hz out of the stroke speed frequency components. An envelope waveform forming unit 342 performs scalarization on the extracted unsprung resonance component to form an envelope waveform using Envelope Filter. A gain multiply unit 343 multiplies the scalarized unsprung resonance component by a gain to calculate an unsprung vibration suppression damping force control amount, and outputs the unsprung vibration suppression damping force control amount to the damping force control unit 35. Note that, in the first embodiment, although an unsprung resonance component is extracted by causing a band-pass filter to act on the stroke speed outputted from the traveling-state estimator 32, an unsprung resonance component may be extracted such that in the traveling-state estimator 32, an unsprung speed is estimated and calculated together with the sprung speed.

(Configuration of Damping Force Control Unit)

Figure 15:
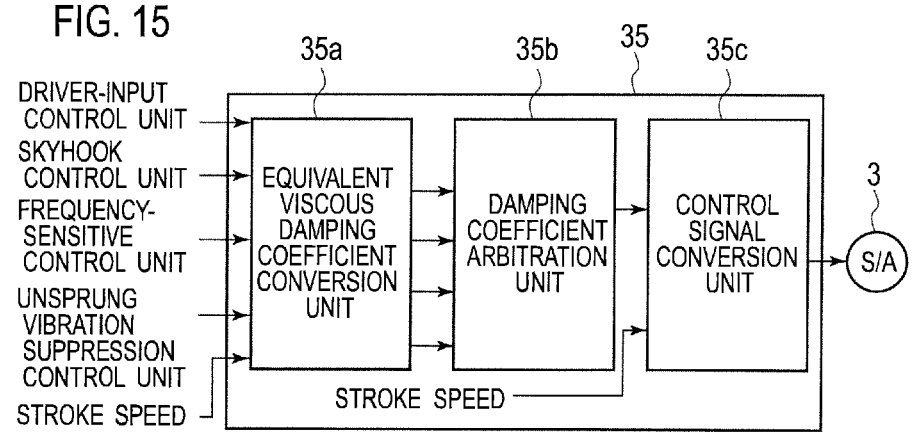
FIG. 15 is a control block diagram illustrating a control configuration in a damping force control unit according to the first embodiment.

Next, a configuration of the damping force control unit is explained. FIG. 15 is a control block diagram illustrating a control configuration of the damping force control unit in the first embodiment. An equivalent viscous damping coefficient conversion unit 35a is inputted with the driver input damping force control amount outputted from the driver-input control unit 31, the S/A attitude control amount outputted from the skyhook control unit 33a, the frequency-sensitive damping force control amount outputted from a frequency-sensitive control unit 33b, the unsprung vibration suppression damping force control amount outputted from the unsprung vibration suppression control unit 34, and the stroke speed calculated by the traveling-state estimator 32, and coverts these values into equivalent viscous damping coefficients.

A damping coefficient arbitration unit 35b arbitrates among the damping coefficients (hereinafter, the respective damping coefficients are described as a driver input damping coefficient k1, an S/A attitude damping coefficient k2, a frequency-sensitive damping coefficient k3, and an unsprung vibration suppression damping coefficient k4) converted in the equivalent viscous damping coefficient conversion unit 35a to decide a damping coefficient on which the control is based, and outputs a final damping coefficient. A control signal conversion unit 35c converts the value into a control signal (command current value) with respect to the S/A 3 on the basis of the damping coefficient arbitrated by the damping coefficient arbitration unit 35b and the stroke speed, and outputs the control signal to the S/A 3.

[Damping Coefficient Arbitration Unit]

Next, the arbitration content of the damping coefficient arbitration unit 35b is explained. The control apparatus for a vehicle in the first embodiment includes four control modes as follow: firstly, a standard mode assuming a state where a moderate turning state can be obtained while traveling in a normal urban area or the like; secondly, a sports mode assuming a state where a stable turning state can be obtained while actively traveling on a winding road or the like; thirdly, a comfort mode assuming a traveling state where priority is given to a ride comfort at the time of start at a low-vehicle speed or the like; and fourthly, a highway mode assuming a state of traveling on a superhighway most of which is in a straight line state or the like at a high-vehicle speed.

In the standard mode, such control is performed that priority is given to the unsprung vibration suppression control by the unsprung vibration suppression control unit 34 while performing the skyhook control by the skyhook control unit 33a.

In the sports mode, the skyhook control by the skyhook control unit 33a and the unsprung vibration suppression control by the unsprung vibration suppression control unit 34 are performed while giving priority to the driver-input control by the driver-input control unit 31.

In the comfort mode, such control is performed that priority is given to the unsprung vibration suppression control by the unsprung vibration suppression control unit 34 while performing the frequency-sensitive control by the frequency-sensitive control unit 33b.

In the highway mode, such control is performed that the control amount of the unsprung vibration suppression control by the unsprung vibration suppression control unit 34 is added to the skyhook control by the skyhook control unit 33a while giving priority to the driver-input control by the driver-input control unit 31.

Hereinafter, arbitration for each damping coefficient in each of these modes is explained.

(Arbitration in Standard Mode)

Figure 16:
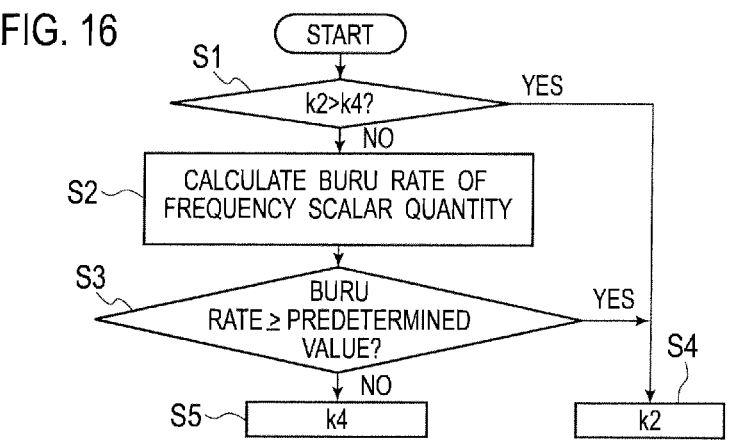
FIG. 16 is a flowchart illustrating damping coefficient arbitration processing in a standard mode according to the first embodiment.

FIG. 16 is a flowchart illustrating damping coefficient arbitration processing in the standard mode in the first embodiment.

At Step S1, it is determined whether or not the S/A attitude damping coefficient k2 is larger than the unsprung vibration suppression damping coefficient k4. If larger, the process proceeds to Step S4 and the k2 is set as a damping coefficient.

At Step S2, on the basis of the scalar quantities of the frequency region fuwa, the frequency region hyoko, and the frequency region buru, which have been explained in the explanation of the frequency-sensitive control unit 33b, a rate (scalar quantity) of the frequency region buru is calculated.

At Step S3, it is determined whether or not the rate of the frequency region buru is a predetermined value or higher. If the predetermined value or higher, because there is a concern that a ride comfort might become worse due to the high frequency vibration, the process proceeds to Step S4 and the k2 that is a low value is set as a damping coefficient. In contrast, if the rate of the frequency region buru is less than the abovementioned predetermined value, because a ride comfort is less likely to become worse due to the high frequency vibration even if a high damping coefficient is set, the process proceeds to Step S5 and the k4 is set.

As described the above, in the standard mode, priority is given to the unsprung vibration suppression control which suppresses the unsprung resonance in principle. However, when the damping force requested by the skyhook control is lower than the damping force requested by the unsprung vibration suppression control and the rate of the frequency region buru is larger, the damping force of the skyhook control is set, thereby preventing the high frequency vibration characteristic from becoming worse caused with satisfying the request of the unsprung vibration suppression control. This allows the optimal damping characteristic according to the traveling state to be obtained, thereby making it possible to simultaneously prevent the ride comfort from becoming worse due to the high frequency vibration while attaining the sense of flatness of the vehicle body.

(Arbitration in Sports Mode)

Figure 17:
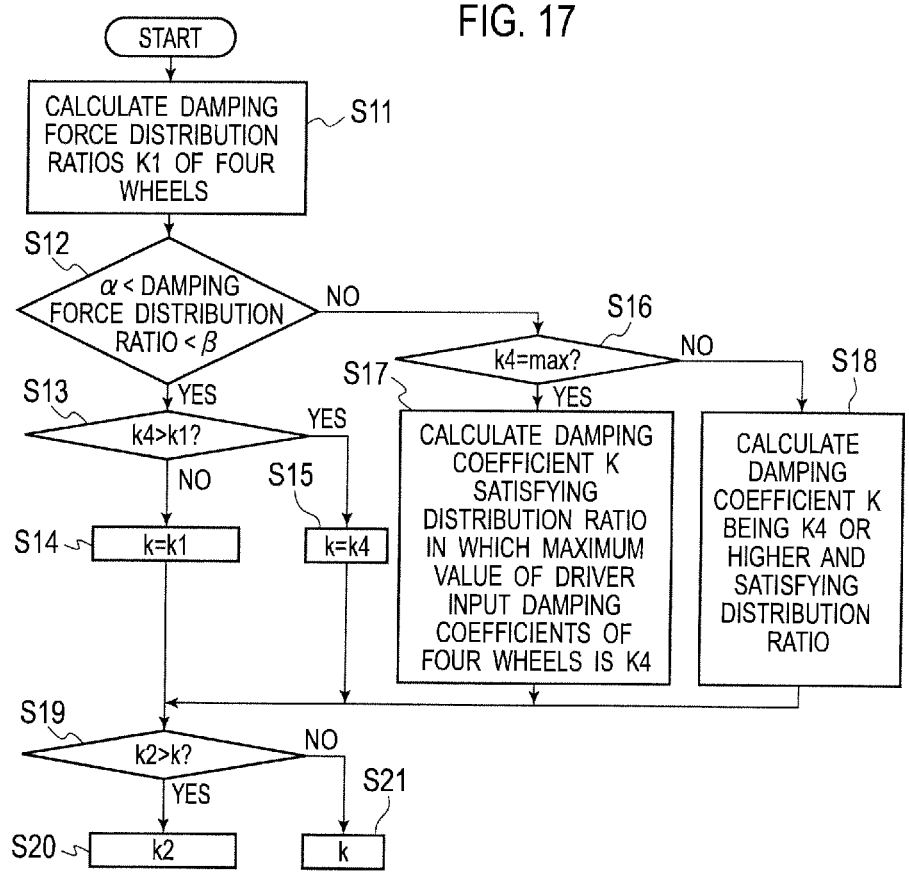
FIG. 17 is a flowchart illustrating damping coefficient arbitration processing in a sports mode according to the first embodiment.

FIG. 17 is a flowchart illustrating damping coefficient arbitration processing in the sports mode in the first embodiment.

At Step S11, damping force distribution ratios of the four wheels are calculated on the basis of the four-wheel driver input damping coefficients k1 set by the driver-input control. When a driver input damping coefficient of the right front-wheel is k1fr, a driver input damping coefficient of the left front-wheel is k1fl, a driver input damping coefficient of the right rear-wheel is k1rr, a driver input damping coefficient of the left rear-wheel is k1rl, and the damping force distribution ratios of the respective wheels are xfr, xfl, xrr, and xrl, the damping force distribution ratios of the four wheels are calculated by the following equations.

$$xfr = k1fr/(k1fr+k1fl+k1rr+k1rl)$$

$$xfl = k1fl/(k1fr+k1fl+k1rr+k1rl)$$

$$xrr = k1rr/(k1fr+k1fl+k1rr+k1rl)$$

$$xrl = k1rl/(k1fr+k1fl+k1rr+k1rl)$$

At Step S12, it is determined whether or not each of the damping force distribution ratios x is within a predetermined range (larger than α and smaller than β). If within the predetermined range, it is determined that the distribution to each wheel is nearly equivalent, and the process proceeds to Step S13, whereas even if any one of these is out of the predetermined range, the process proceeds to Step S16.

At Step S13, it is determined whether or not the unsprung vibration suppression damping coefficient k4 is larger than driver input damping coefficient k1. If it is determined larger, the process proceeds to Step S15 and the k4 is set as a first damping coefficient k. In contrast, if it is determined that the unsprung vibration suppression damping coefficient k4 is equal to or less than the driver input damping coefficient k1, the process proceeds to Step S14 and the k1 is set as the first damping coefficient k.

At Step S16, it is determined whether or not the unsprung vibration suppression damping coefficient k4 is a maximum value max that the S/A 3 can set. If it is determined as the maximum value max, the process proceeds to Step S17, whereas in other cases, the process proceeds to Step S18.

At Step S17, a damping coefficient in which the maximum value of the driver input damping coefficients k1 of the four wheels is the unsprung vibration suppression damping coefficient k4 and the damping force distribution ratio is satisfied is calculated as the first damping coefficient k. In other words, a value having the highest damping coefficient while satisfying the damping force distribution ratio is calculated.

At Step S18, a damping coefficient in which all the driver input damping coefficients k1 of the four wheels are within the range of the k4 or higher and the damping force distribution ratio is satisfied is calculated as the first damping coefficient k. In other words, a value which satisfies the damping force distribution ratio set by the driver-input control and also satisfies the request at the unsprung vibration suppression control side is calculated.

At Step S19, it is determined whether or not the first damping coefficient k set in the abovementioned respective steps is smaller than the S/A attitude damping coefficient k2 set by the skyhook control. If it is determined smaller, because the damping coefficient requested from the skyhook control side is larger, the process proceeds to Step S20 and the k2 is set. In contrast, is it determined that the k is k2 or higher, the process proceeds to Step S21 and the k is set.

As described the above, in the sports mode, priority is given to the unsprung vibration suppression control which suppresses the unsprung resonance in principle. However, the damping force distribution ratio requested from the driver-input control side is closely related to the vehicle body attitude, specially is deeply related to the visual-line change of the driver by the roll mode. Accordingly, the highest priority is given to secure the damping force distribution ratio, not the damping coefficient requested from the driver-input control side itself. Moreover, as for a motion that brings attitude change of the in a state where the damping force distribution ratio is kept, the stable vehicle body attitude can be maintained by selecting the skyhook control at the select-high.

(Arbitration in Comfort Mode)

Figure 18:
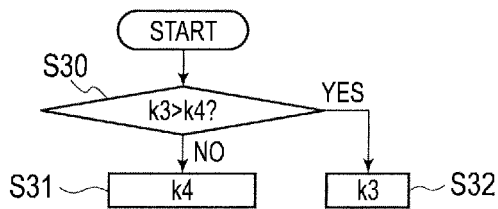
FIG. 18 is a flowchart illustrating damping coefficient arbitration processing in a comfort mode according to the first embodiment.

FIG. 18 a flowchart illustrating damping coefficient arbitration processing mode in the comfort mode in the first embodiment.

At Step S30, it is determined whether or not the frequency-sensitive damping coefficient k3 is larger than the unsprung vibration suppression damping coefficient k4. If it is determined larger, the process proceeds to Step S32 and the frequency-sensitive damping coefficient k3 is set. In contrast, if it is determined that the frequency-sensitive damping coefficient k3 is equal to or less than the unsprung vibration suppression damping coefficient k4, the process proceeds to Step S31 and the unsprung vibration suppression damping coefficient k4 is set.

As described the above, in the comfort mode, basically priority is given to the unsprung resonance control which suppresses the unsprung resonance. The frequency-sensitive control is originally performed as the sprung vibration suppression control to set the optimal damping coefficient in accordance with the status of the road surface, thereby making it possible to attain the control of securing a ride comfort. This allows the unsprung vibration suppression control to prevent the less sense of road holding due to the unsprung flapping. Note that, the comfort mode may be configured such that, similar to the standard mode, the damping coefficients are switched according to the rate of the frequency region buru that is the frequency scalar quantity. This allows a ride comfort to be further secured as a super-comfort mode.

(Arbitration in Highway Mode)

Figure 19:
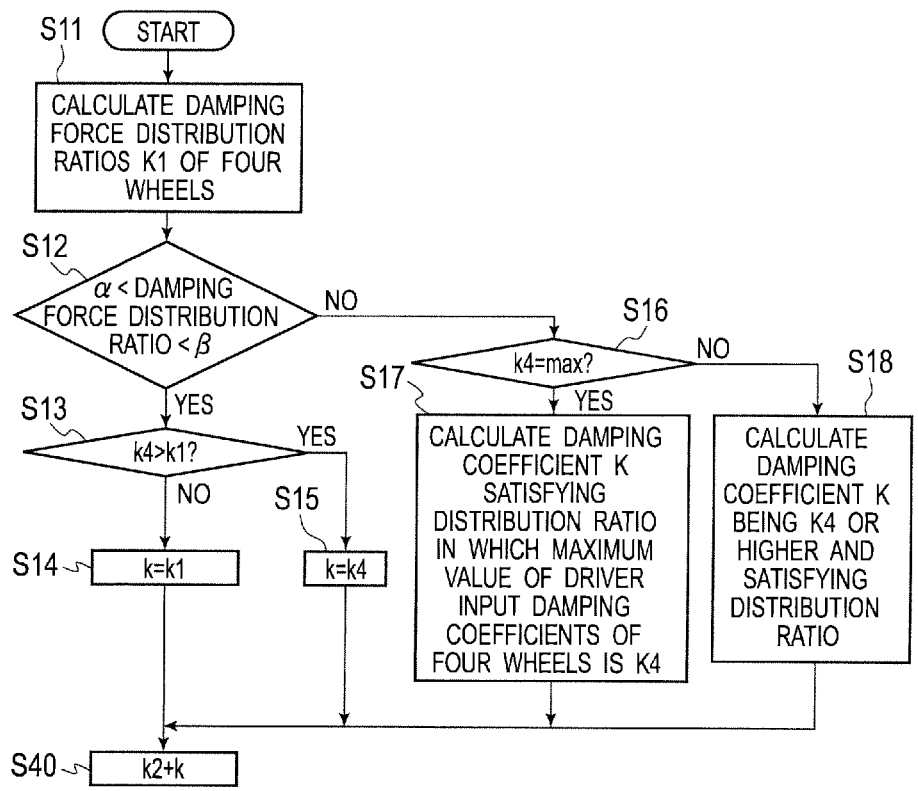
FIG. 19 is a flowchart illustrating damping coefficient arbitration processing in a highway mode according to the first embodiment.

FIG. 19 is a flowchart illustrating damping coefficient arbitration processing in the highway mode in the first embodiment. Note that, the arbitration processing from Step S11 to Step S18 is the same as that in the sports mode, and therefore explanation thereof is omitted.

At Step S40, the S/A attitude damping coefficient k2 by the skyhook control is added to the first damping coefficient k having arbitrated before Step S18, and the added value is outputted.

Figure 20:
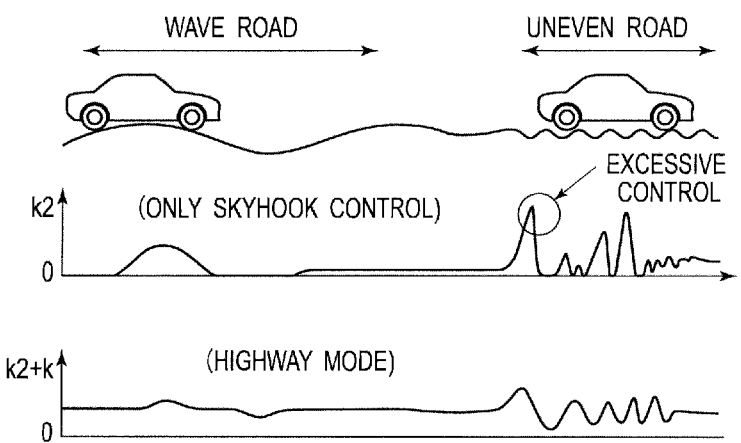
FIG. 20 is a time chart illustrating change of a damping coefficient when traveling on a wave road surface and an uneven road surface.

As described the above, in the highway mode, the damping coefficient is arbitrated using the value obtained by adding the S/A attitude damping coefficient k2 to the arbitrated first damping coefficient k. Here, the effect is explained using the drawing. FIG. 20 is a time chart illustrating change of the damping coefficient when traveling on a wave road surface and an uneven road surface. For example, when a motion such that a vehicle body wobbles by the influence due to slight waves or the like on the road surface motion is intended to be suppressed during traveling at a high-vehicle speed, a slight stroke speed is required to be detected for the control attained by only the skyhook control. Accordingly, the much higher skyhook control gain is required to be set. In this case, although the wobbling motion can be suppressed, the excessive damping force control might be performed because the control gain is too large when recesses and projections on the road surface are generated. This causes a concern that the ride comfort might become worse or the vehicle body attitude might become worse.

In contrast, because the first damping coefficient k is set all the time in the highway mode, the damping force to some extent is secured all the time. This makes it possible to suppress the wobbling motion of the vehicle body with the smaller damping coefficient by the skyhook control. Moreover, because the skyhook control gain is not required to be increased, it is possible to cope with the recesses and projections on the road surface with the normal control gain. In addition, because the skyhook control is performed in a state where the first damping coefficient k is set, different from the damping coefficient limit, an operation of decreasing step the damping coefficient is possible in the semi-active control region. This secures a stable vehicle attitude when traveling at a high speed.

(Mode Selection Processing)

Figure 21:
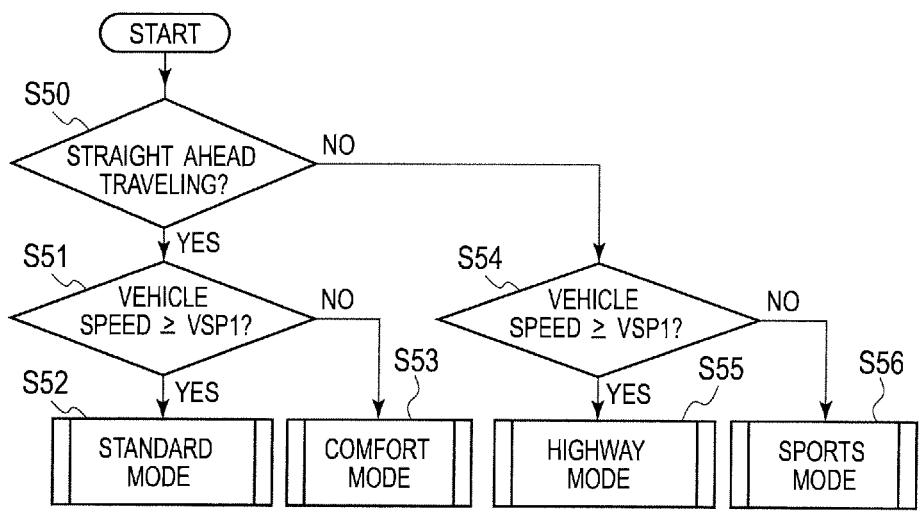
FIG. 21 is a flowchart illustrating mode selection processing in a damping coefficient arbitration unit based on a traveling state according to the first embodiment.

Next, mode selection processing which selects the abovementioned respective traveling modes is explained. FIG. 21 is a flowchart illustrating mode selection processing in a damping coefficient arbitration unit based on a traveling state according to the first embodiment.

At Step S50, it is determined whether or not a straight ahead traveling state on the basis of the value by the steering angle sensor 7. If it is determined as the straight ahead traveling state, the process proceeds to Step S51, whereas if it is determined as a turning state, the process proceeds to Step S54.

At Step S51, it is determined whether or not the vehicle is equal to or higher than a predetermined vehicle speed VSP1 indicating a high-vehicle speed state on the basis of the value by the vehicle speed sensor 8. If it is determined as the VSP1 or higher, the process proceeds to Step S52 and the standard mode is selected. In contrast, if it is determined as less than the VSP1, the process proceeds to Step S53 and the comfort mode is selected.

At Step S54, it is determined whether or not the vehicle is equal to or higher than a predetermined vehicle speed VSP1 indicating a high-vehicle speed state on the basis of the value by the vehicle speed sensor 8. If it is determined as the VSP1 or higher, the process proceeds to Step S55 and the highway mode is selected. In contrast, if it is determined as less than the VSP1, the process proceeds to Step S56 and the sports mode is selected.

In other words, in the straight ahead traveling state, it is possible to stabilize the vehicle body attitude by the skyhook control by selecting the standard mode when traveling at a high-vehicle speed, to secure a ride comfort by suppressing the high frequency vibration included in the frequency region hyoko or the frequency region buru, and, in addition, to suppress the unsprung resonance. Moreover, selecting the comfort mode when traveling at a low-vehicle speed makes it possible to suppress the unsprung resonance while suppressing the vibration included in the frequency region hyoko or the frequency region buru to be inputted to the occupant as much as possible.

In contrast, in the turn traveling state, selecting the highway mode when traveling at a high-vehicle speed makes it possible to basically obtain the high damping force because the control is performed by the value to which the damping coefficient is added. This allows the unsprung resonance to be suppressed while actively securing the vehicle body attitude when being turned by the driver-input control even at a high-vehicle speed. Moreover, selecting the sports mode when traveling at a low-vehicle speed makes it possible to suppress the unsprung resonance while actively securing the vehicle body attitude when being turned by the driver-input control and performing the skyhook control as appropriate, and to travel in the stable vehicle attitude.

Note that, with respect to the mode selection processing, a control example is indicated in the first embodiment that a traveling state is detected to automatically switch the mode. However, for example, control is made such that a switch or the like that a vehicle driver can operate is provided to select a traveling mode. Accordingly, a ride comfort or a turn performance in accordance with the traveling intention by the vehicle driver can be obtained.

As explained the above, the first embodiment exhibits functional effects listed below.

(1) Provided are the engine 1, the brake 20, and the S/A 3 (a plurality of actuators) which perform sprung vibration suppression control, the vertical acceleration sensor 15 configured to detect a sprung vertical acceleration, and the engine controller 1a, the brake controller 2a, and the S/A controller 3a (a plurality of actuator attitude control units) which control the engine 1, the brake 20, and the S/A 3 (the respective actuators) such that the sprung state (the vertical acceleration: the first traveling-state estimator 100, the second traveling-state estimator 200, and the third traveling-state estimator 32) detected by the vertical acceleration sensor 15 becomes a target sprung state (vertical acceleration corresponding thereto).

Accordingly, because the feedback control system is configured in each of the actuators using the vertical acceleration as a common value, performing individual control without mutually monitoring in a control manner results in performing control due to the mutual monitoring. This allows the vehicle attitude to be converged in the stabilization direction. In other words, when a plurality of actuators are individually operated without mutually monitoring the operation states, there arises a problem of control interference. However, because the feedback control system based on the vertical acceleration is configured in each of the actuators, the influence due to the control by each of the actuators appears as each vertical acceleration. The control interference is prevented by mutually monitoring the influence due to each control as a result. For example, if certain sprung vibration is suppressed by the engine 1, change of the vertical acceleration arises with the suppression. Even if the other actuators do not notice the control content performed by the engine 1, the brake 20 or the S/A 3 may control on the basis of the vertical acceleration to which the influence is reflected.

Note that, in the first embodiment, although an example in which vehicle body attitude control is performed by the skyhook control is indicated, the control may be attained by other vehicle body attitude control. Further, in the first embodiment, although a control object is a pitch rate, the control object may be a bounce rate or the like. Moreover, in the first embodiment, although a flat attitude serves as a target attitude, from a viewpoint that the field of vision a vehicle driver during being turned is secured, for example, a nose dive like vehicle body attitude may be served as a target attitude. Moreover, not limiting control for the sprung attitude, but also control for unsprung vibration suppression may be performed.

(2) The engine 1, the brakes 20, and the S/As 3 constitute a plurality of actuators, and the engine controller 1a (driving power source attitude control unit), the brake controller 2a (brake attitude control unit), and the S/A controller 3a (damping force control unit) constitute a plurality of actuator attitude control units.

In other words, when the sprung vibration suppression control is performed only with the S/A 3 having a high control ability of the sprung attitude, for example, without performing cooperative control with the actuators, a damping force is required to be increased for suppressing the sprung slow motion. However, because the increase of the damping force causes the vibration transmissibility to the sprung portion to be increased, there is a concern that a so-called high frequency vibration characteristic might become worse, that is, a ride comfort might become worse due to high frequency vibration generated by fine recesses and projections or the like on road surface. Therefore, lowering the damping force control amount of the S/A 3 by the engine 1 or the brake 20 that is an actuator not related to the high frequency vibration characteristic becoming worse makes it possible to reduce the vibration transmissibility to the sprung portion and prevent the high frequency vibration characteristic from becoming worse. Moreover, the engine 1 or the brake 20 can decrease the damping force control amount. This allows the comparatively narrower controllable region of the S/A 3, thereby attaining the vehicle body attitude control by the low-cost configuration.

(3) The sprung vibration suppression control unit 101a (driving power source attitude control unit) suppresses the bounce movement and the pitch movement of the vehicle body.

In other words, when the sprung vibration suppression control is performed only with the S/A 3 having a high control ability of the sprung attitude, for example, without performing cooperative control with the actuators, a damping force is required to be increased for suppressing the sprung slow motion. However, because the increase of the damping force causes the vibration transmissibility to the sprung portion to be increased, there is a concern that a so-called high frequency vibration characteristic might become worse, that is, a ride comfort might become worse due to high frequency vibration generated by fine recesses and projections or the like on road surface. Therefore, suppressing the bounce movement and the pitch movement of the vehicle body by the engine 1 that is an actuator not related to the high frequency vibration characteristic becoming worse lowers the damping force control amount of the S/A 3. This can reduce vibration transmissibility to the sprung portion, thereby making it possible to prevent the high frequency vibration from becoming worse. Moreover, because the S/A 3 can concentrate on suppressing the roll movement, the roll movement can be effectively suppressed.

(4) The engine attitude control unit 101 (driving power source attitude control unit) has a limit value for limiting the engine attitude control amount to a predetermined value. In other words, the engine attitude control unit 101 limits the engine torque control amount when being converted into a longitudinal acceleration to be within a predetermined range of longitudinal acceleration. Accordingly, the engine attitude control unit 101 calculates an engine attitude control amount (engine torque control amount) on the basis of the skyhook control amount FB in the bounce direction or the skyhook control amount FP in the pitch direction, and outputs, when the value thus calculated is the limit value or higher, the engine attitude control amount the skyhook control amount in the pitch direction or in the bounce direction which can be attained by the limit value. This makes it possible to attain the vehicle body attitude control without no discomfort feeling is given to the occupant.

(5) The skyhook control unit 201 (friction brake attitude control unit) suppresses the pitch movement of the vehicle body.

Generally, because the brake 20 can control both of the bounce and the pitch, it can be also said that the brake 20 may preferably control the both. However, the bounce control by the brake 20 had a tendency to give the vehicle driver a discomfort feeling. This is because the bounce control by the brake 20 generates braking forces simultaneously to the four wheels in the direction with the low control priority to cause the strong sense of deceleration regardless of difficulty in obtaining a control effect. Therefore, as for the brake 20, priority is given to suppression of the pitch movement than suppression of the bounce movement, and the configuration specialized in the pitch control is employed in the first embodiment. This makes it possible to suppress the sense of deceleration, and thereby to reduce a discomfort feeling to the occupant.

Here, in the first embodiment, if the braking force is applied when the pitch rate Vp is positive, that is, when the front-wheel side is depressed, the front-wheel side is further depressed to promote the pitch movement. Accordingly, in this case, no braking force is applied. In contrast, when the pitch rate Vp is negative, that is, the front-wheel side is lifted, application of a braking force due to the braking pitch moment suppresses the front-wheel side from being lifted. This secures a field of vision of the vehicle driver, and allows the vehicle driver to easily see the forward to contribute to improve the sense of security and the sense of flatness. Moreover, braking torque is generated only when the front side of the vehicle body is lifted. This enables the reduced deceleration to be generated compared with a case where braking torque is generated in both of the cases where the front side of the vehicle body is lifted and depressed. Moreover, only a half of the frequency of actuator operations is needed, thereby making it possible to employ the low-cost actuator.

Note that, in the first embodiment, although the example specialized in the pitch control is indicated, when both of the pitch movement and the bounce movement are controlled, the pitch movement may be suppressed with priority, or control may be performed by multiplying the control amount of the bounce movement by a gain making the control amount decrease. This is because performing the pitch control with higher priority than the bounce control attains the object of the present invention.

Moreover, in the first embodiment, although the example of employing the skyhook control as the pitch control, other control theory may be employed as long as the configuration of outputting braking torque which suppresses the pitch rate.

(6) The skyhook control unit 201 (friction brake attitude control unit) has a limit value for limiting the brake attitude control amount to a predetermined value such that a change rate of deceleration of the vehicle body becomes a predetermined value or less.

Specifically, the jerk threshold value limiting unit 3342*d* determines whether or not the change rate of the calculated target deceleration, that is, a jerk is within the ranges of the deceleration jerk threshold value and the remove jerk threshold value which are set in advance, and the target deceleration is within the range of the longitudinal acceleration limit value. If the jerk exceeds either of the threshold values, the target deceleration is corrected to be a value within the range of the jerk threshold value, and if the target deceleration exceeds the limit value, the target deceleration is set within the range of the limit value. This allows deceleration to be generated in such a manner that no discomfort feeling is given to the vehicle driver.

(7) Provided are the engine 1, the brake 20 and the S/A 3 (a plurality of actuators) which perform sprung vibration suppression control, the vertical acceleration sensor 15 configured to detect a sprung vertical acceleration, and the engine controller 1*a*, the brake controller 2*a*, and the S/A controller 3*a* (actuator attitude control units) which control the engine 1, the brake 20, and the S/A 3 (the respective actuators) such that the sprung state (the vertical acceleration: the first traveling-state estimator 100, the second traveling-state estimator 200, and the third traveling-state estimator 32) detected by the vertical acceleration sensor 15 becomes a target sprung state (vertical acceleration corresponding thereto).

Accordingly, because the feedback control system is configured in each of the actuators using the vertical acceleration as a common value, performing individual control without mutually monitoring in a control manner results in performing control due to mutual monitoring. This allows the vehicle attitude to be converged in the stabilization direction.

(8) The vertical acceleration sensor 15 configured to detect the sprung vertical acceleration is provided, and the engine controller la, the brake controller 2*a*, and the S/A controller 3*a* (controllers) control the engine 1, the brakes 20, and the S/As 3 (the plurality of actuators) such that sprung state (the vertical acceleration: the first traveling-state estimator 100, the second traveling-state estimator 200, and the third traveling-state estimator 32) detected by the vertical acceleration sensor 15 becomes a target sprung state (a vertical acceleration corresponding thereto).

Accordingly, because the feedback control system is configured in each of the actuators using the vertical acceleration as a common value, performing individual control without mutually monitoring in a control manner results in performing control due to mutual monitoring. This allows the vehicle attitude to be converged in the stabilization direction.

As described the above, although the first embodiment has been explained, the embodiment is provided merely as an example to easily understand the present invention, and the present invention is not limited to the embodiment. The technical range of the present invention is not limited to the concrete technical features disclosed in the abovementioned embodiment, and may include various modifications, changes, substitutions which can be easily induced therefrom.

For example, in the first embodiment, although the configuration provided with three actuators of the engine 1, the brake 20, and the S/A 3 as actuators performing sprung vibration suppression control is employed, the configuration provided only with the engine 1 and the brake 20, the configuration provided only with the engine 1 and the S/A 3, or the configuration provided only with the brake 20 and the S/A 3 may be employed. With any combination, a plurality of actuators can and cooperated and operated, and achieve stabilized control.

This application is based upon and claims the benefit of priority from Japanese Patent Application No. 2012-066458, filed on 23 Mar. 2012, the entire contents of which are incorporated herein by reference.

What is claimed is:

1. A control apparatus for a vehicle comprising:
   a plurality of actuators configured to perform sprung vibration suppression control by suppressing a bounce movement, a pitch movement and a roll movement of a vehicle body,
   a vertical acceleration sensor configured to detect a sprung vertical acceleration, and
   a plurality of actuator attitude control units configured to control the respective actuators such that the vertical acceleration detected by the vertical acceleration sensor becomes a vertical acceleration corresponding to a target sprung state, wherein
   the plurality of actuators are a driving power source, a friction brake, and a damping force variable shock absorber of the vehicle, and
   the plurality of actuator attitude control units are a driving power source attitude control unit, a friction brake attitude control unit, and a damping force control unit, and
   the driving power source attitude control unit suppresses only the bounce movement and the pitch movement, and the damping force control unit suppresses only the roll movement, a control of the driving power source, a control of the friction brake, and a control of the damping force variable shock absorber are performed in parallel to suppress a damping force control amount of the damping force variable shock absorber.

2. The control apparatus for a vehicle according to claim 1, wherein the driving power source attitude control unit has a limit value for limiting a driving power source attitude control amount to a predetermined value.

3. The control apparatus for a vehicle according to claim 1, wherein the friction brake attitude control unit suppresses the pitch movement of the vehicle body.

4. The control apparatus for a vehicle according to claim 1, wherein the friction brake attitude control unit has a limit value for limiting a brake attitude control amount to a predetermined value such that a change rate of deceleration of the vehicle body becomes a predetermined value or less.

5. A control method for a vehicle which includes a sensor configured to detect sprung vertical acceleration, comprising:
   a step of controlling, by a controller, a plurality of actuators configured to perform sprung vibration suppression control by suppressing a bounce movement, a pitch movement and a roll movement of a vehicle body, such that a vertical acceleration detected by the sensor becomes a vertical acceleration corresponding to a target sprung state, the plurality of actuators are a driving power source, a friction brake, and a damping force variable shock absorber of the vehicle, and
   a step of controlling, by the controller, the driving power source configured to suppress only the bounce movement and the pitch movement, and the damping force variable shock absorber configured to suppress only the roll movement, in which a control of the driving power source, a control of the friction brake, and a control of the damping force variable shock absorber are performed in parallel to suppress a damping force control amount of the damping force variable shock absorber.

6. The control apparatus for a vehicle according to claim 1, wherein suppression of the bounce movement and the pitch movement by the driving power source and the friction brake is performed prior to the suppression of the roll movement by the damping force variable shock absorber.

7. The method according to claim 5, wherein suppression of the bounce movement and the pitch movement by the driving power source and the friction brake is performed prior to the suppression of the roll movement by the damping force variable shock absorber.

* * * * *